United States Patent
Bert

(10) Patent No.: US 11,520,656 B2
(45) Date of Patent: Dec. 6, 2022

(54) MANAGING CAPACITY REDUCTION AND RECOVERY DUE TO STORAGE DEVICE FAILURE

(71) Applicant: Micron Technology, Inc., Boise, ID (US)

(72) Inventor: Luca Bert, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/207,432

(22) Filed: Mar. 19, 2021

(65) Prior Publication Data
US 2022/0300372 A1 Sep. 22, 2022

(51) Int. Cl.
| | |
|---|---|
| G06F 11/10 | (2006.01) |
| G06F 11/07 | (2006.01) |
| G06F 11/14 | (2006.01) |
| G06F 3/06 | (2006.01) |
| G06F 11/32 | (2006.01) |

(52) U.S. Cl.
CPC ........ G06F 11/1068 (2013.01); G06F 3/0619 (2013.01); G06F 3/0652 (2013.01); G06F 3/0683 (2013.01); G06F 11/0772 (2013.01); G06F 11/1435 (2013.01); G06F 11/327 (2013.01)

(58) Field of Classification Search
CPC ............. G06F 11/1068; G06F 11/1072; G06F 3/0619; G06F 3/0652; G06F 3/068; G11C 29/52; G11C 29/70
See application file for complete search history.

(56) References Cited

U.S. PATENT DOCUMENTS

| | | | |
|---|---|---|---|
| 8,843,697 B2* | 9/2014 | Kim .................... | G06F 12/0246 711/103 |
| 8,862,952 B1 | 10/2014 | Booth et al. | |
| 11,055,176 B1 | 7/2021 | Helmick et al. | |
| 11,126,378 B1 | 9/2021 | Parker et al. | |
| 11,307,931 B1 | 4/2022 | Bert | |
| 2001/0038554 A1* | 11/2001 | Takata .................... | G11C 29/76 365/185.09 |
| 2010/0057966 A1 | 3/2010 | Ambikapathy et al. | |
| 2010/0293439 A1 | 11/2010 | Flynn et al. | |
| 2013/0326159 A1 | 12/2013 | Vijayan et al. | |
| 2015/0378613 A1* | 12/2015 | Koseki .................. | G06F 3/0635 711/103 |
| 2016/0062666 A1 | 3/2016 | Samuels et al. | |
| 2016/0364181 A1 | 12/2016 | McGlaughlin et al. | |
| 2019/0043604 A1 | 2/2019 | Baca et al. | |

(Continued)

*Primary Examiner* — Shelly A Chase
(74) *Attorney, Agent, or Firm* — Lowenstein Sandler LLP

(57) ABSTRACT

A system and method for managing a reduction in capacity of a memory sub-system. An example method involving a memory sub-system: detecting a failure of a plurality of memory devices of the set, wherein the failure causes data of the plurality of memory devices to be inaccessible; determining the capacity of the set of memory devices has changed to a reduced capacity; notifying a host system of the reduced capacity, wherein the notifying indicates a set of storage units comprising the data that is inaccessible; recovering the data of the set of storage units from the host system after the failure; and updating the set of memory devices to store the recovered data and to change the capacity to the reduced capacity.

20 Claims, 12 Drawing Sheets

(56) References Cited

U.S. PATENT DOCUMENTS

| | | |
|---|---|---|
| 2019/0250980 A1 | 8/2019 | Frolikov |
| 2020/0020398 A1 | 1/2020 | Miller et al. |
| 2020/0081648 A1* | 3/2020 | Bernat ................ G06F 11/3055 |
| 2020/0089407 A1 | 3/2020 | Baca et al. |
| 2020/0241956 A1* | 7/2020 | Son ........................ G06F 3/065 |
| 2020/0310645 A1 | 10/2020 | Li |
| 2020/0393974 A1 | 12/2020 | Bahirat |
| 2020/0401515 A1 | 12/2020 | Liang et al. |
| 2021/0048952 A1 | 2/2021 | Cariello |
| 2021/0064249 A1 | 3/2021 | Mehta et al. |
| 2021/0089217 A1 | 3/2021 | Bjorling et al. |
| 2021/0103495 A1 | 4/2021 | Kim et al. |
| 2021/0160318 A1 | 5/2021 | Sajeepa et al. |
| 2021/0182166 A1 | 6/2021 | Hahn |
| 2021/0263674 A1 | 8/2021 | Shin et al. |

* cited by examiner

1000

```
┌─────────────────────────────────────────────────────────────────┐
│ Determining, by a host system, that a failure affects a storage │
│ capacity of a memory sub-system, wherein the memory sub-system  │
│ comprises stored data of a storage structure                    │
│                            1010                                 │
└─────────────────────────────────────────────────────────────────┘
                                 │
                                 ▼
┌─────────────────────────────────────────────────────────────────┐
│ Instructing, by the host system, the memory sub-system to       │
│ operate at a reduced capacity and to retain the stored data of  │
│ the storage structure                                           │
│                            1020                                 │
└─────────────────────────────────────────────────────────────────┘
                                 │
                                 ▼
┌─────────────────────────────────────────────────────────────────┐
│ Receiving, by the host system, a set of storage units of the    │
│ memory sub-system that are affected by the failure              │
│                            1030                                 │
└─────────────────────────────────────────────────────────────────┘
                                 │
                                 ▼
┌─────────────────────────────────────────────────────────────────┐
│ Recovering, by the host system, data that was in the set of     │
│ storage units affected by the failure                           │
│                            1040                                 │
└─────────────────────────────────────────────────────────────────┘
```

FIG. 10

MANAGING CAPACITY REDUCTION AND RECOVERY DUE TO STORAGE DEVICE FAILURE

TECHNICAL FIELD

Embodiments of the disclosure relate generally to memory sub-systems, and more specifically, relate to managing capacity reductions to memory sub-systems.

BACKGROUND

A memory sub-system can include one or more memory devices that store data. The memory devices can be, for example, non-volatile memory devices and volatile memory devices. In general, a host system can utilize a memory sub-system to store data on the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 10 is a flow chart of a method executed by the host system to manage the reduction of capacity of the memory sub-system, in accordance with some embodiments of the present disclosure.

DETAILED DESCRIPTION

Figure 1:
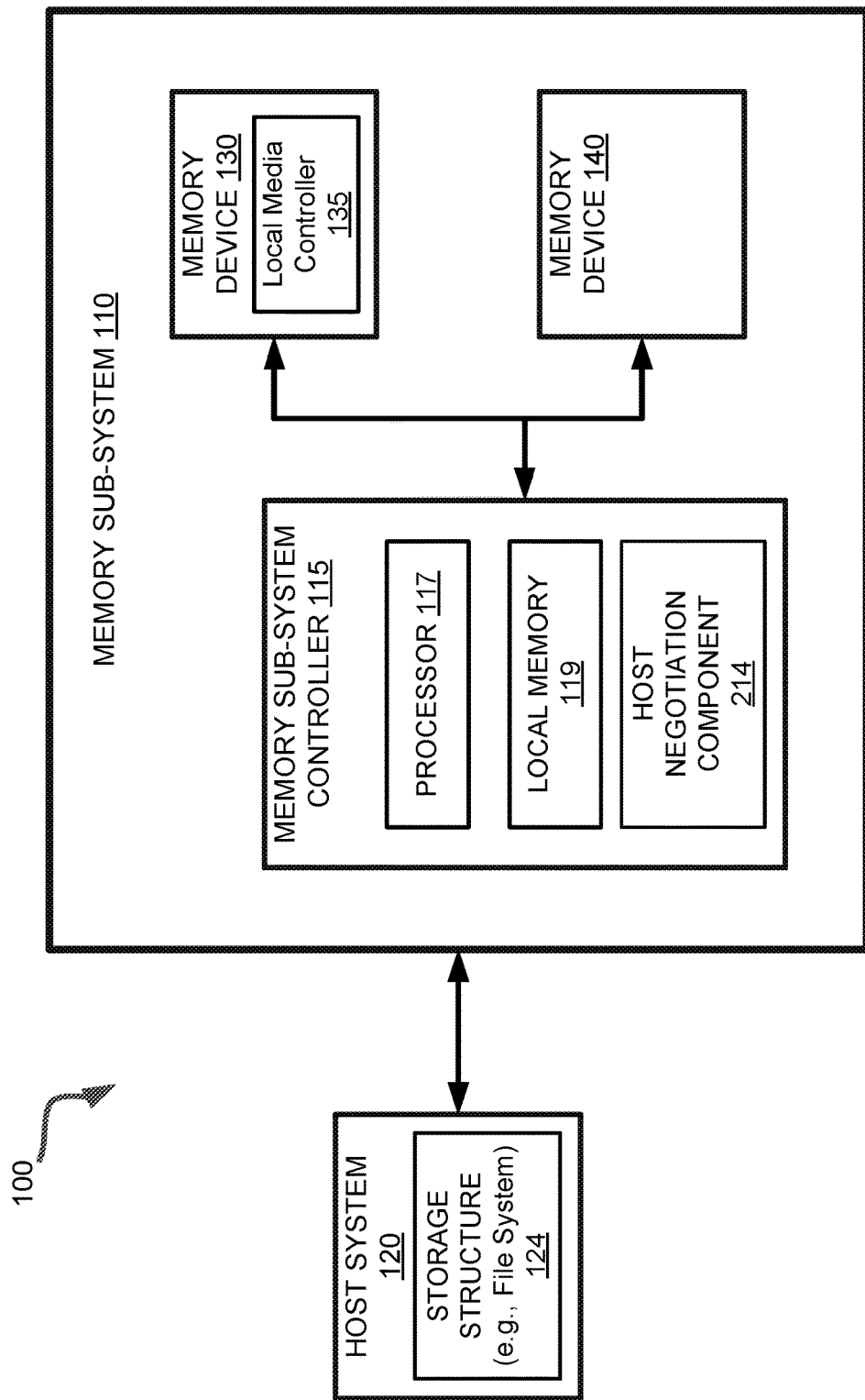
FIG. 1 illustrates an example computing system that includes a host system and a memory sub-system, in accordance with some embodiments of the present disclosure.

Aspects of the present disclosure enable a host system and memory sub-system to manage failures by remaining operational at a reduced capacity. The memory sub-system can be a storage device, a memory module, or a combination of a storage device and memory module. Examples of storage devices and memory modules are described below in conjunction with FIG. 1. In general, the host system can utilize a memory sub-system that includes one or more memory devices that store data. The host system can provide data to be stored at the memory sub-system and can request data to be retrieved from the memory sub-system.

A memory sub-system can be susceptible to failures that reduce the capacity of the memory sub-system and adversely affect the host system. For example, the memory sub-system can include multiple memory devices and one or more of the memory devices can fail and reduce the capacity of the memory sub-system. In the past, the memory sub-system would be replaced when one of the memory devices failed. Modern memory sub-systems can include many memory devices (e.g., 256 dies) and can store large amounts of data (e.g., 128 terabytes). A failure of a single memory device means that there are many other memory devices that are still functioning. Replacing the memory sub-system that has functioning memory devices wastes the remaining memory devices and often requires relocating large amounts of data.

Modern memory sub-systems often provide fault tolerance that handles failures in a manner that is transparent to the host system. The memory sub-systems are manufactured with a storage size and a first portion of the storage size is made available to the host system, while a second portion can be reserved for internal use (e.g., over provisioning or redundancy). The first portion of the storage size that is available to the host system is referred to as the storage capacity. When a failure occurs that reduces the total amount of storage, the memory sub-system can reduce the size of the second portion set aside for internal use so that the size of the first portion available to the host remains the same (e.g., the storage capacity is unchanged). This can be performed transparent to the host system because the memory sub-system can recover data stored on a failed memory device and store it at another location that can be made available to the host system. This type of transparent fault tolerance can be limited in the types of failures it handles and the amount of storage loss it can sustain, and although it can retain the storage capacity, it can adversely affect the performance or reliability of the memory sub-system.

Aspects of the present disclosure address the above and other deficiencies by enabling a host system and a memory sub-system to manage a reduction in the capacity of the memory sub-system. In one embodiment, the memory sub-system can detect a failure in the memory sub-system that affects the storage capacity available to the host system. The memory sub-system can include a set of memory devices and the failure can affect any portion of the memory sub-system and affect access to data stored on one or more of the memory devices in the set. In one example, one or more of the memory devices can fail (e.g., die failure, plane failure) or can become inaccessible (e.g., channel or connector failure). In another example, the memory device can store more than one bit of information per memory cell (e.g., 4 bits per cell) and the memory device can fail to function as expected and can be downshifted to store less bits of information per memory cell (e.g. 3 bits per cell instead of 4 bits per cell). In either of these examples, the failure can result in a reduction to the storage capacity and the memory sub-system can communicate with the host system to manage the reduction in capacity of the memory sub-system. For example, the memory sub-system can notify the host system that a failure occurred and indicate the amount of storage that was affected, the remaining capacity, or a combination thereof. The host system can acknowledge the failure and indicate whether or not the memory sub-system should be updated to operate at a reduced capacity. The update can preserve data that was not affected by the failure, recover data affected by the failure, relocate data internal or external to the memory sub-system, or a combination thereof.

Advantages of the present disclosure include but are not limited to enhancing the efficiency, duration, and use of memory sub-systems. In particular, the technology can be advantageous because it enables a memory sub-systems to remain in use for a longer duration before being replaced and therefore decreases the total cost of ownership (TCO). In one example, each time one of the memory devices fail (e.g., a NAND die fails), the memory sub-system can update its configuration to operate at a lower capacity using the remaining memory devices. This updating can occur repeatedly and in response to each failure until the last memory device fails. This enables the memory sub-systems to sustain multiple failures over time and remain in operation for a longer duration before being replaced. Other advantages include enabling a memory sub-system to reduce the capacity while retaining reliability, performance, and efficiency of the memory sub-system. As discussed above, a memory sub-system can keep the capacity constant in response to a failure by taking a portion of storage used for internal use and making that portion available to the host system. The portion taken could have been used for over provisioning or redundancy and its removal can reduce the performance, reliability, or efficiency of the memory sub-system. Additional advantages include enabling the host system and memory sub-system to reduce the capacity of the memory sub-system without minimizing the storage used for internal use. The technology disclosed herein can also enable the host system and memory sub-system to preserve data when the capacity is reduced. Host systems often handle a reduction in capacity by reformatting the memory sub-system, which deletes data on the memory sub-system. Prior to reformatting, the host system copies data of the memory sub-system to temporary storage and then copies, recovers, corrects, or otherwise recreates the data back onto the memory sub-system after the reformatting. The technology disclosed herein reduces or avoids the computational resources consumed by the copying (e.g., processor cycles, I/O, temporary storage space) by preserving data that was not affected by the failure and in some examples by recovering some or all of the data affected by the failure. Other advantages will be apparent to those skilled in the art of data storage and memory devices as discussed hereinafter.

FIG. 1 illustrates an example computing system 100 that includes a memory sub-system 110 and a host system 120 in accordance with some embodiments of the present disclosure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The computing system 100 includes a storage structure 124 in the host system 120 and a host negotiation component 214 in memory sub-system 110. Storage structure 124 can be configured to adapt to a reduction in the capacity of memory sub-system 110, as discussed throughout the figures. In some embodiments, the host system 120 includes at least a portion of the capacity management functionality. In other embodiments, or in combination, the controller 115 and/or processing device 223 of host system 120 includes at least a portion of the capacity management functionality. For example, the controller and the processing device (processor) of the host system 120 can be configured to execute instructions stored in memory for performing operations to manage the reduction in capacity of the memory sub-system and for configuring the storage structure 124 in view of the reduced capacity as described herein.

Figure 2:
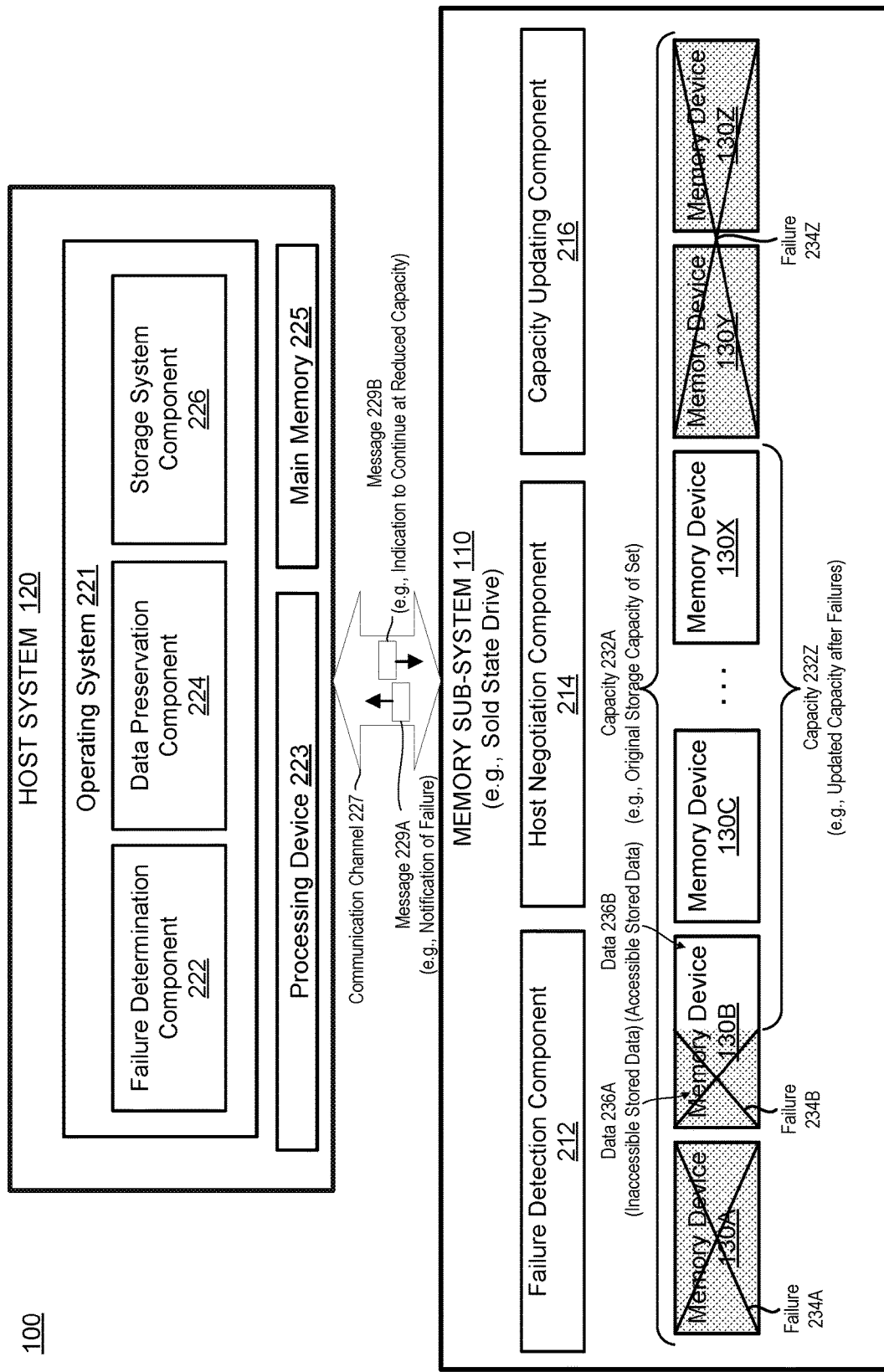
FIG. 2 is a detailed block diagram of the host system and the memory sub-system of FIG. 1, in accordance with some embodiments of the present disclosure.

FIG. 2 is a detailed block diagram of the computing system 100 that includes a host system 120 and a memory sub-system 110 that can adapt to failures by reducing the capacity of the memory sub-system 110. One or more of the failures can occur at the same time or at different times and can be spread over an extended duration of time (e.g., days, weeks, years). The technology can enable host system 120 and memory sub-system 110 to repeatedly adapt to the reduction in capacity caused by each failure. In the example shown, memory sub-system 110 can be associated with multiple memory devices 130A-Z, capacities 232A-Z, failures 234A-Z, and data 236A-B.

Memory devices 130A-Z can include high density non-volatile memory devices where retention of data is desired when no power is supplied to the memory device. One example of non-volatile memory devices is a negative-and (NAND) memory device. Other examples of non-volatile memory devices are described above in conjunction with memory device 130 of FIG. 1. A non-volatile memory device is a package of one or more dies with sets of blocks (e.g., physical blocks) and each block can include a set of pages. A page can include a set of cells (e.g., memory cells) and each cell can be an electronic circuit that stores information. Depending on the cell type, a cell can store one or more bits of binary information and can have various logic states that correlate to the number of bits being stored. The logic states can be represented by binary values, such as "0" and "1", or combinations of such values. Example cell types include Single-Level Cells (e.g., 1 bit per cell), Multi-Level Cell (e.g., 2 bits per cell), Triple-Level Cell (e.g., 3 bits per cell), Quad-Level Cells (e.g., 4 bits per cell), other quantity, or a combination thereof.

A set of memory devices can include one or more memory devices of memory sub-system 110. The set can include all of the memory devices of a memory sub-system or some of the memory devices of a memory sub-system. In the example shown in FIG. 2, the set of memory devices of memory sub-system 110 can include multiple memory devices 130A-Z that are each separate and independent from one another (e.g., different dies). In other examples, the set of memory devices can include a single memory device and the single memory device can include one or more regions, sections, or portions that are managed separately or together. In either example, the set of memory devices can be associated with different capacities over time due to device failures (e.g., capacities 232A-Z).

Capacities 232A-Z represent the capacity of memory sub-system 110 at different points in time. Each of capacities 232A-Z can be a storage capacity that indicates the data storage space available to host system 120 (e.g., maximum amount of data a host system can store on a memory sub-system). The storage capacity can be based on the capacity or size of the set of memory devices. In one example, the terms capacity and size can be used interchangeable. In another example, the term capacity and size can be different and the size can be the total storage size and the capacity can be the portion of the total storage size that is available externally to the host system. The remaining portion of the total size can be used for internal purposes (e.g., over provisioning, storing parity data, etc.). In other examples, the term capacity can also or alternatively refer to or be based on a channel capacity and correspond to a rate at which data can be accessed, written, read, copied, moved, or transmitted to or from one or more memory sub-systems 110, memory devices 130A-Z, host system 120, or a combination thereof.

The capacity of the set of memory devices 130A-Z can change over time and capacity 232A can be an initial capacity and capacity 232Z can be an updated capacity (e.g., reduced capacity). The initial capacity can be the original capacity of the memory sub-system 110 at a time of design, manufacture, assembly, installation, initialization, or other time. The updated capacity can be the capacity of the memory sub-system at a subsequent point in time and can be the same, smaller, or larger than the initial capacity. In the example shown in FIG. 2, capacity 232A can be an initial capacity (e.g., 1 terabyte) of memory sub-system 110 at installation time and is based on all of the memory devices 130A-Z in the set being fully functional. Capacity 232Z can be an updated capacity (e.g., 900 gigabytes) of memory sub-system 110 after the set of memory devices 130A-Z have encountered one or more failures 234A-Z.

Failures 234A-Z can include any failure that affects the capacity of memory sub-system 110. A failure can cause a portion of memory sub-system 110 to stop working as designed. The portion can include or be related to a memory device (e.g., NAND die, memory cell), memory controller (e.g., controller 115 or 135), connector (e.g., package connector, interface), interconnect, expander, bus, other portion of memory sub-system 110 or host system 120, or a combination thereof. The failure can affect data that is stored by memory sub-system 110 and cause the data to be inaccessible, incorrect, inaccurate, unreliable, unpredictable, missing, erased, other effect, or a combination thereof. In one example, the failure can cause the portion to completely stop working (e.g., cease operation). In another example, the failure can cause the portion to partially stop working and the portion can continue operating but be unable to satisfy one or more thresholds (e.g., below a minimum threshold or above a maximum threshold). The one or more thresholds can include or relate to performance thresholds, reliability thresholds, capacity thresholds, redundancy thresholds, other thresholds, or a combination thereof. The detection of failures and use of thresholds are discussed in more detail in regards to failure detection component 212 of FIGS. 2 and 4.

Failures 234A-Z can include hardware failures, software failures, other failures, or a combination thereof. A hardware failure can be any failure caused by hardware of memory sub-system 110. Example hardware failures can include die failures, connector failures, communication channel failures, package failures, other hardware failures, or a combination thereof. A software failure can be any failure caused by computer code of memory sub-system 110, such as the computer code executed by a controller of memory sub-system 110 (e.g., firmware, microcode, machine code, opcode, hardware instructions, or program code). A single hardware or software failure can affect a portion of the memory device, the entire memory device, or multiple memory devices of memory sub-system 110. Failures 234A-Z can occur due to a defect, flaw, imperfection, or deficiency in one or more of the memory devices, connectors, bus, expanders, packages, other portion of memory sub-system 110 or host system 120, or a combination thereof.

A failure can occur at any time and can be determined or detected before, during, or after the failure affects the capacity of the memory sub-system 110. In one example, one or more of failures 234A-Z can occur after the device is being used by host system 120 (e.g., operational failure). In another example, one or more of failures 234A-Z can occur before being used by host system 120 but are not detected until after being used by host system 120 (e.g., latent failure, hidden failure). In either example, failures 234A-Z can occur at the same time or at different times and the different times can be separated by one or more minutes, hours, days, weeks, years, decades, or other duration of time. In the example shown, failures 234A-Z can occur at different times and affect different portions of memory sub-system 110. For example, failure 234A can occur at a first time (time t) and can affect the entire memory device 130A (e.g., die failure causing 100% storage loss of the memory device). Failure 234B can occur at a second time (t+1 month) and can affect a portion of memory device 130B (e.g., cell failures causing 50% storage loss of the memory device). Failure 234Z can occur at a third time (t+1 year) and can be a single failure that affects multiple memory devices 130Y-Z (e.g., bus failure). In any of the examples provided, the failure can adversely affect data 236A-B stored by memory sub-system 110 and cause some of data 236A-B to become inaccessible.

Data 236A-B can be data stored by memory sub-system 110 in one or more memory devices. Data 236A-B can be data that is provided to memory sub-system 110 or can be data generated by memory sub-system 110. The data provided to memory sub-system 110 can be referred to as user data or external data and can be externally accessible data that can be provided by host system 120 or another memory sub-system. The data generated by memory sub-system 110 can be referred to as internal data and can be data that is not externally accessible and is used for internal uses (e.g., management, mapping, maintenance, wear leveling, redundancy, etc.).

Memory sub-system 110 can include one or more components that are used to manage a failure and to communicate with host system 120 to manage a change in capacity of memory sub-system 110. In the example shown in FIG. 2, memory sub-system 110 includes a failure detection component 212, a host negotiation component 214, and a capacity updating component 216. Failure detection component 212 can enable memory sub-system 110 to inspect itself to detect a failure and to determine the effect on the capacity of memory sub-system 110. Host negotiation component 214 can enable the memory sub-system 110 to communicate with the host system 120 to indicate the occurrence and/or consequences of a failure. Host negotiation component 214 can also interact with host system 120 to recover and relocate data. Capacity updating component 216 enables memory sub-system 110 to reduce the capacity of the memory sub-system 110 with or without preserving data and to rebuild internal data in view of the reduced capacity (e.g., rebuild parity data). Components 212, 214, and 216 are discussed in more detail in regards to FIG. 4 and can communicate with host system 120 over communication channel 227.

Communication channel 227 can communicably couple memory sub-system 110 with host system 120. Communication channel 227 can include one or more interfaces, connectors, interconnects, adapters, other piece of hardware or software, or a combination thereof. Communication channel 227 can implement a standard or proprietary communication protocol that includes or is based on Non-Volatile Memory Express™ (NVMe), Advanced Host Controller Interface™ (AHCI), Serial Advanced Technology Attachment Interface™ (e.g., SATA, mSATA), Peripheral Component Interconnect™ (e.g., PCI, PCIe), Small Computer System Interface™ (SCSI, iSCSI), Integrated Drive Electronics™ (e.g., IDE, EIDE), InfiniBand™, Compute Express Link™ (CXL), other communication technology, or a combination thereof. Memory sub-system 110 and host system 120 can use communication channel 227 to transmit one or more messages 229A-B.

Messages 229A-B can be messages that relate to a failure or to a change in capacity caused by the failure. A message can be the same or similar to a signal, interrupt, notification, event, indication, packet, frame, datagram, other communication unit, or a combination thereof. A message can be a signal that is absent message content or can be a signal that includes message content at the beginning (e.g., header), middle (e.g., payload, body), or end (e.g., tail, footer, trailer) of the message. The message content can be data (e.g., message data) that includes identification data (e.g., event, event type, command, source, or target identifier), pointer data (e.g., address of a set or other data structure), other data, or a combination thereof. In one example, one or more of messages 229A-B can be an Asynchronous Event Notifications (AEN), an Asynchronous Event Request (AER), other asynchronous or synchronous event, or a combination thereof. In the example shown in FIG. 3, message 229A can be transmitted from memory sub-system 110 to host system 120 and message 229B can be transmitted from host system 120 to memory sub-system 110. Messages 229A and 229B are discussed in more detail in regards to FIG. 4 and FIG. 5.

Host system 120 can include an operating system 221 that includes one or more components that enable it to use messages 229A-B to communicate with memory sub-system 110 and manage a reduction of the capacity of the memory sub-system 110. Host system 120 can include one or more processing devices 223 and main memory 225 to execute operating system 221 and a failure determination component 222, a data preservation component 224, and a storage system component 226. Failure determination component 222 enables host system 120 to determine that memory sub-system 110 has detected a failure that causes a reduction in capacity. Data preservation component 224 can enable host system 120 to continue to use the memory sub-system at the reduced capacity and preserve data, recover data, or a combination thereof. Storage system component 226 enables the host system 120 to reconfigure one or more storage structures (e.g., file systems or databases) based on the failure and the reduced capacity. Components 222, 224, and 226 are discussed in more detail in regards to FIG. 5.

Figure 3:
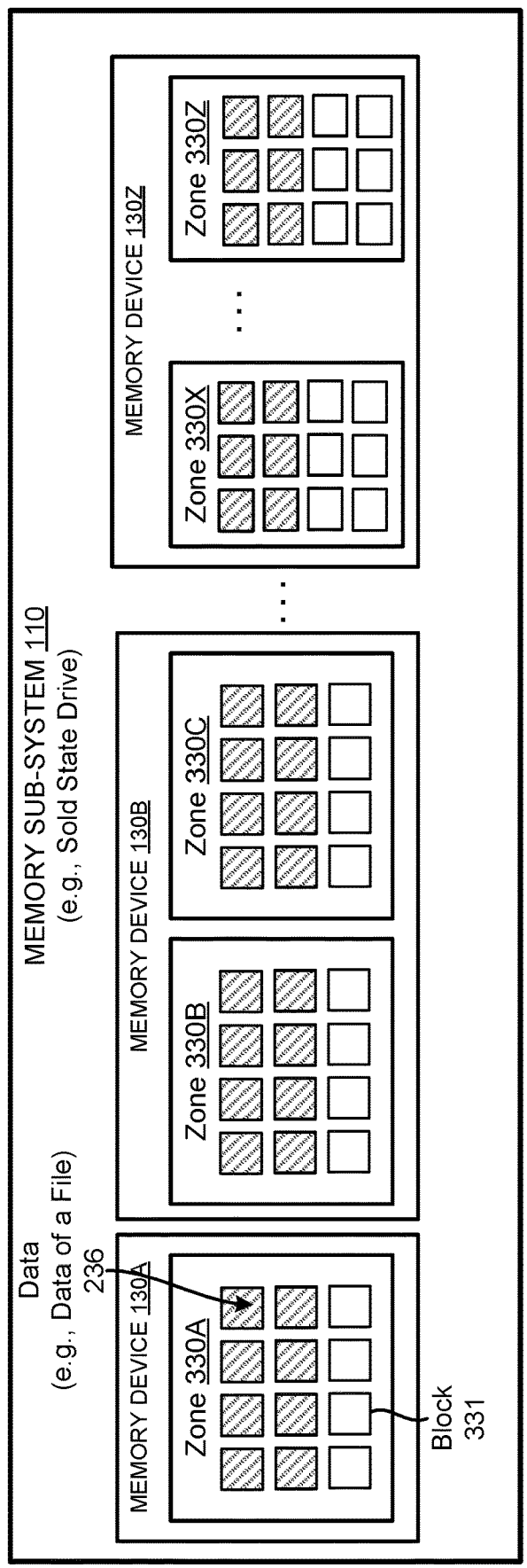
FIG. 3 is a block diagram of a memory sub-system that includes a zoned namespace with multiple zones, in accordance with some embodiments of the present disclosure.

FIG. 3 is a detailed block diagram of a memory sub-system 110 that includes multiple zones. Memory sub-system 110 can be the same or similar to memory sub-system 110 of FIGS. 1 and 2 and can include multiple memory devices 130A-Z. Memory devices 130A-Z can be made up of memory cells arranged in a two-dimensional grid. The memory cells can be etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline can constitute the address of the memory cell. A block 331 can refer to a storage unit of the memory device (e.g., 130A) used to store data and can include a group of memory cells, a wordline group, a wordline, or individual memory cells. One or more blocks 331 can be grouped together to form a larger storage unit that is referred to as a zone. Each of memory device 130A-Z can include one or more zones.

Memory sub-system 110 can be configured with a namespace that includes multiple zones 330A-Z. The namespace can include the address space of one or more of the memory devices 130A-Z. A namespace is a quantity of non-volatile memory that can be formatted into blocks (e.g., logical or physical blocks). A controller of memory sub-system 110 (e.g., controller 115 or 135) can support multiple namespaces that are referenced using namespace identification data (e.g., namespace IDs, beginning LBA). A namespace can be associated with a namespace data structure that is created, updated, or deleted using namespace management or namespace attachment commands. The namespace data structure can indicate capabilities and settings that are specific to a particular namespace. In one example, the name data structure and the namespace can correspond to a zoned namespace.

A zoned namespace (ZNS™) can be a sequential namespace that is defined by the NVM Express™ (NVMe™) organization. A memory device that is configured with a zoned namespace can be referred to as a zoned namespace memory device or a ZNS memory device and can implement the zoned namespace command set as defined by NVMe. In a zoned namespace, the address space of each of the memory devices 130A-Z can be divided into one or more zones 330A-Z. When using a zoned namespace, writes can be performed sequentially starting from the beginning of a zone and can be performed at a larger granularity (e.g., 64 kilobytes) and the zone can be inaccessible for the duration of the write operation. Accordingly, if a read request for data stored in the same zone or a different zone is received while the write operation is ongoing, the memory sub-system 110 will have to suspend the write operation in order to perform the read. In one example, the zoned namespace can be implemented by a controller of a solid state drive (SSD) and include zones 330A-Z, in which there can be one or more zones for each of the one or more memory devices 130A-Z. The use of zones is advantageous because it enables more efficient management of storage space as the capacity of the memory device increases. For example, a set of one or more zones can be designated for use by a specific application (e.g., application, process, or thread) executed by a host system or some other system with access to the memory device.

Each of the zones 330A-Z can be a contiguous or non-contiguous portion of a memory device (e.g., range of blocks) that is identified and managed as a single storage unit. Each zone can correspond to zone identification data that can be used to uniquely identify the zone and can be the same or similar to a zone identifier (zone ID), a zone descriptor, a zone label, or other term. A zone can be a memory storage unit (e.g., memory unit) and can have a predefined size that can be based on (e.g. a multiple of) a size of another memory storage unit (e.g., block, cell, page, die, device, or sub-system). Memory sub-system 110 can use a fixed size (e.g., constant size or static size) for the zones in which all of the zones can be the same size or can use a variable size (e.g., adjustable size, dynamic size) in which the zones used by memory sub-system 110 can have different sizes. The size of the zone can be determined (e.g., selected or detected) by memory sub-system 110, memory devices 130A-Z, host system 120, storage system, device driver, other entity, or a combination thereof.

Updating a zone can include resetting the zone and writing to the zone. Resetting the zone can involve one or more operations that include erasing, updating, configuring, or formatting the zone or data of the zone (e.g., content or metadata). Either the host system or memory sub-system can initiate the reset and one or more of operations can be executed by the host system, memory sub-system (e.g., controller 115), memory device (e.g. controller 135), other processor, or a combination thereof. In one example, resetting a zone can update a location of zone's write pointer to a new location (e.g., reset write pointer to beginning of the zone). Writing to the zone is generally performed sequentially from the write pointer. The sequential write can be performed consecutively from the top of the memory device (e.g., smaller addresses of IC die) to the bottom of the memory device (e.g., larger addresses of the IC die).

Figure 4:
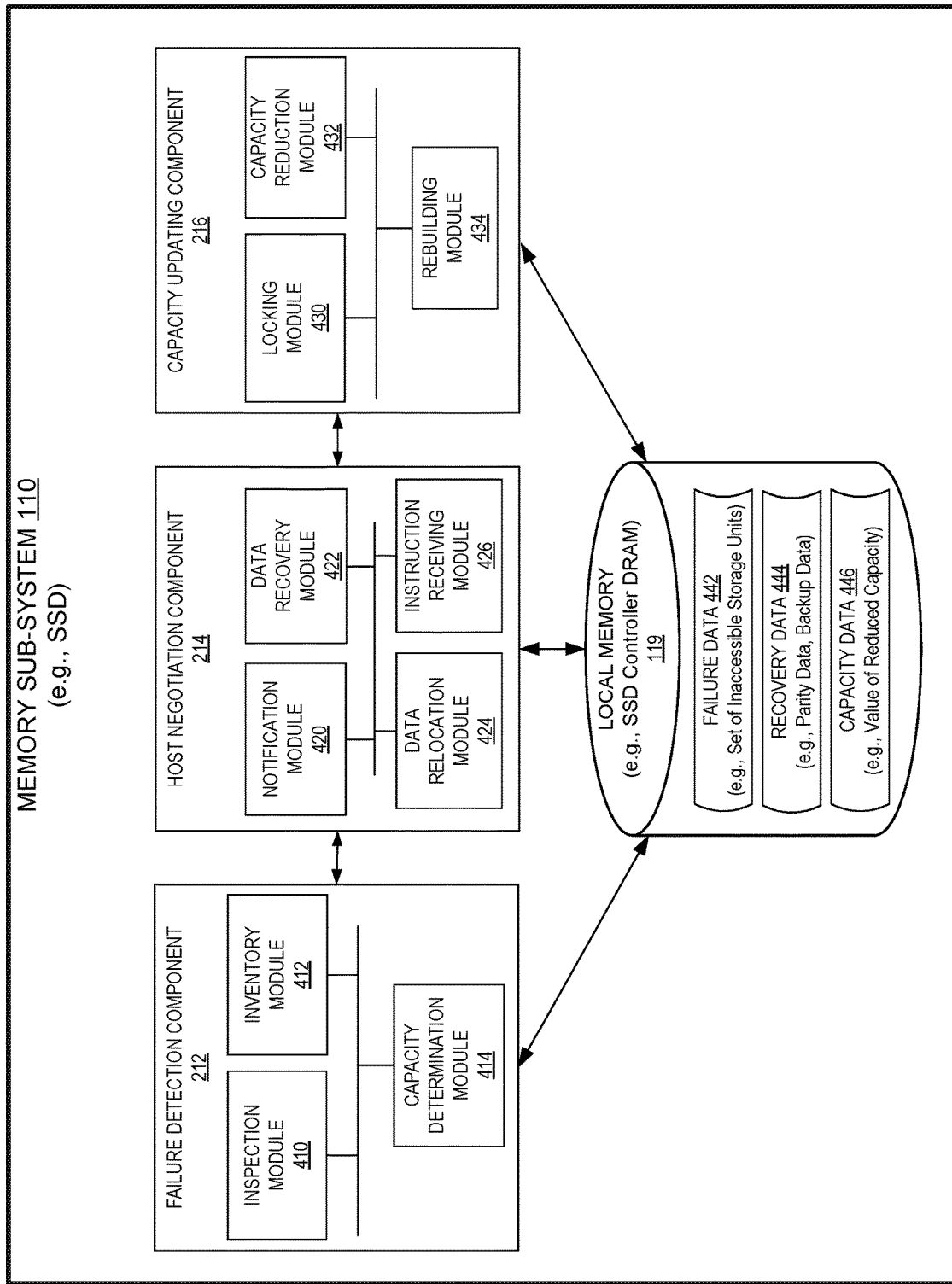
FIG. 4 is a detailed block diagram of a memory sub-system, in accordance with some embodiments of the present disclosure.

FIG. 4 is a block diagram illustrating exemplary components of a memory sub-system 110. In one example, memory sub-system 110 can be a Solid State Drive (SSD) that includes memory devices, local memory 119 (e.g., DRAM), and one or more processing devices (e.g., memory controllers) for executing logic of the components. In the example illustrated, memory sub-system 110 can be the same or similar to the memory sub-system 110 of FIG. 1-3 and can include a failure detection component 212, a host negotiation component 214, and a capacity updating component 216 in memory sub-system controller 115, local media controller 135, or a combination thereof. The features of the components and modules can be implemented in computer code (e.g., firmware, software, or other computer program), in hardware (e.g., circuitry), or a combination thereof. More or less components or modules can be included without loss of generality and two or more of the components or modules can be combined into a single unit, or features of a component can be separated into two or more units.

Failure detection component 212 enables memory sub-system 110 to detect and log failures that can affect the capacity of the memory sub-system 110. As discussed above, a failure can affect stored data or the ability to access the stored data and can be associated with any portion of memory sub-system 110, such as one or more of the memory devices, controllers, connectors, interfaces, etc. In the example shown in FIG. 4, failure detection component 212 can include an inspection module 410, an inventory module 412, and a capacity determination module 414.

Inspection module 410 can enable memory sub-system 110 to inspect one or more portions of a memory sub-system 110 to detect an indication of a failure. The portions can include or be related to a memory device (e.g., NAND Die), memory controller (e.g., controller 115 or 135), connector (e.g., package connector, interface), interconnect, bus, expander, other portion of memory sub-system 110 or host system 120, or a combination thereof. Inspection module 410 can provide a device self-test and include executable logic that enables a processing device of the memory sub-system 110 (e.g., controller 115 or 135) to inspect the portion indirectly or directly.

Indirectly inspecting a portion of memory sub-system can involve inspecting one or more data structures that represent the portion and store an indication of a failure. The indication of the failure can be a signal, message, or data that indicates the existence of a failure, a size of a failure, a type of failure, a location of a failure, a quantity of a failures, other aspect of a failure, or a combination thereof. The data structure can be or include one or more logs (e.g., error log, access log), pointers (e.g., memory address of failure), identifiers (e.g., zone identifier, logical block address), flags (e.g., bit flag, processor register), list (e.g., linked list), index, queue, array, table, matrix, other data structure, or a combination thereof.

Directly inspecting a portion of memory sub-system can involve scanning or testing the portion of the memory sub-system that has the failure. Scanning the portion can be the same or similar to searching and can involve accessing or attempting to access the portion and analyzing the results of the access (e.g., check whether value can be read, location can be accessed, response is received). Testing the portion can involve accessing the portion and comparing the results of the access with expected data (e.g., comparing read values with expected values or thresholds). Testing can also or alternatively provide an input that is subsequently tested. For example, the testing can provide the input (e.g., write data, send signal) and subsequently check the input or its corresponding output (e.g., read the written data, check for a response to the signal).

Inspecting the portion can involve generating or updating one or more measurements. The measurements can indicate a reliability, performance, other aspect of the portion of memory sub-system, or a combination thereof. The measurements can include one or more numeric values, character values, statistical values, probabilistic values, other values, or a combination thereof and can represent a quantity, percentage, ratio, mean, median, standard deviation, or other mathematical property. In one example, the measurement can be a reliability measurement that represents the ability for the portion (e.g., memory device, memory cell) to reliably store data. The reliability measurement can be based on the number of times the portion reliably or unreliably stores data and the value can increase or decrease when the data stored by the portion includes an error (e.g., bit flip, invalid value, wrong voltage).

Inventory module 412 enables memory sub-system 110 to inventory the failures by updating an inventory with data related to the failures. The data related to the failures can be stored in local memory 119 as failure data 442. Failure data 442 can be the same or similar to health data and can include data identifying or describing the effects of failures, causes of failures, indications of failure, other aspect of failures, or a combination thereof. The effects of failures can be the results or outcomes of the failure and can include a set of storage units (e.g., blocks, zones), memory devices, controllers, other portion of memory sub-system 110, or a combination thereof. In one example, inventory module 412 can generate a set of the one or more storage units that have been effected by the failures and store it as failure data 442. The set can be referred to as the failed set, inaccessible set, defective set, malfunctioning set, faulty set, or other term. The cause of the failures can also be detected and recorded (e.g., inventoried) and can relate to temperature (e.g., extreme heat or cold), humidity (e.g., wetness or dryness), electricity (e.g., leakage, current or voltage surge, short circuit, electrostatic discharge), magnetism (e.g., magnetic field, magnetic force), electromagnetism (e.g., electromagnetic inference (EMI), electromagnetic radiation (EMR)), other cause, or a combination thereof.

Capacity determination module 414 enables memory sub-system 110 to determine the capacity of the memory sub-system 110 before, during, or after a failure. As discussed above, the capacity can be a storage capacity that is based on the storage size of a set of one or more memory devices. The storage capacity can be less than the storage size of the set and can depend on the amount of storage space used for internal use (e.g., internal data and data structures). Determining the capacity can be based on whether the memory sub-system 110 is providing over provisioning, wear leveling, error detection, error correction, recovery, redundancy, garbage collection, compression, encryption, other feature, or a combination thereof. In one example, capacity determination module 414 can calculate the change in capacity or the new capacity (e.g., reduced capacity) based on the set of storage units effected by failures, a set of storage units unaffected by failures, all the storage units, or a combination thereof. The calculation can involve aggregating (e.g., adding) the capacity or size of one or more of these sets and storing the result as capacity data 446.

Capacity determination module 414 can determine one or more new capacities, which can each be referred to as a failure induced capacity. When determining the failure induced capacity there can be a tradeoff (e.g., inverse relationship) between capacity and one or more other features of the memory sub-system, such as, performance, reliability, recoverability, other features, or a combination thereof. A first failure induced capacity can correspond to a capacity that keeps the other features constant or substantially constant (e.g., with 5% of original). For example, the first failure induced capacity can be for a reduced capacity (e.g., 10% capacity reduction) that keeps the storage space available for internal use constant (e.g., same amount or proportion), which minimizes or eliminates any reduction in space used for overprovisioning and parity data. A second value can correspond to a capacity that minimizes the change to the capacity at the cost of the other features (e.g., performance and recoverability is reduced). For example, this failure induced capacity can minimize the reduction in capacity (e.g., 1% reduction, as opposed to 10% reduction) by allowing for a greater reduction in the storage space available for internal use, which adversely affects overprovisioning, parity data, or other internal use. In one example, the failure induced capacities cab be calculated using one or more mathematical functions (e.g., equations, formulas) that represent relationships between the features (e.g., tradeoff between capacity and performance). The mathematical function can be solved so that one or more of the features are maximized, minimized, remain constant, or a combination thereof.

Host negotiation component 214 enables memory sub-system 110 to communicate with host system 120 to negotiate a change in the capacity of memory sub-system 110. In one example, host negotiation component 214 can include a notification module 420, a data recovery module 422, a data relocation module 424, an instruction receiving module 426, other module, or a combination thereof.

Notification module 420 enables memory sub-system 110 to notify the host system of failures. Notifying the host system can involve generating a notification that indicates an existence of a failure, a type of failure, a portion of the memory sub-system affected by the failure, other information, or a combination thereof. The notification can be in the form of a message (e.g., message 229A) that is sent by memory sub-system 110 and transmitted over a communication channel to the host system. Notification module 420 can transmit one or more messages that corresponds to the same failure. A first message can notify the host system that a failure was detected (e.g., occurred, is present, exists) and can include an indication that the capacity has been reduced. The indication can include one or more values that indicate whether the capacity changed (e.g., binary yes/no), that indicate the amount the capacity changed (e.g., 100 GB lost), that indicate the amount of data affected (e.g., amount of external data and/or internal data effected), that indicate a new capacity, other value, or a combination thereof. A second message can notify the host system of a set of one or more storage units that are affected by the failure. The set of storage units can be a set of blocks (e.g., logical block addresses), zones (e.g., zone identifiers), devices (e.g., dies, packages), other unit, or a combination thereof. The set of storage units can correspond to a single memory device or different memory devices. The second message or a subsequent message can also or alternatively indicate whether data affected by the failure can or cannot be accessed, corrected, or recovered. The first message and the second message can be consolidated into a single message or be spread across more messages.

Data recovery module 422 enables memory sub-system 110 to recover stored data that was affected by the failures. Recovering the stored data can involve accessing recovery data 444 and performing error detection (e.g., detecting data changes), error correction (e.g., fixing changed data), data recovery (recovering erased data), or a combination thereof. The recovery data 444 can be stored in local memory 119 and can include error detection data (e.g., error detection codes, checksums, Cyclic Redundancy Check (CRC)), error correction data (e.g., error correcting code (ECC), forward error correction (FEC), erasure code), redundancy data (e.g., duplicate data, parity data), other data, or a combination thereof. Data recovery module 422 can attempt to access data of one or more of the storage units that are affected by the failure. Data recovery module 422 can use recovery data 444 to detect data that is error free and can be preserved. Data recovery module 422 can also or alternatively use recovery data 444 to correct data that is accessible or to regenerate data that is inaccessible.

When data recovery module 422 generates data that is inaccessible it is possible that memory sub-system 110 can no longer have sufficient storage capacity to store the generated data. Data recovery module 422 can enable memory sub-system 110 to indicate to the host system that the set of memory devices is able to recover the data but unable to store the recovered data. The portion of data that the memory sub-system is unable to store can be referred to as excess data (e.g., data in excess of reduced capacity). The memory sub-system can then receive from the host system a storage location to store the recovered data and provide the recovered data for storage at the storage location. This process is discussed in more detail in regards to data relocation module 424.

Data relocation module 424 enables memory sub-system 110 to relocate data of memory sub-system 110. Relocating data can involve operations that include read, write, move, copy, duplicate, deduplicate, encrypt, decrypt, compress, decompress, other operation, or a combination thereof. Data relocation module 424 can relocate data from a first location (e.g., original location, source location) to one or more second locations (e.g., new location, destination location, target location). The first and second locations can be internal locations that are internal to the memory sub-system 110, external locations that are external to the memory sub-system 110, or a combination thereof. The internal locations can include locations in one or more of the memory devices (e.g., NAND Die) or in the local memory 119 of memory sub-system 110 (e.g., controller DRAM). The external locations can include a location of the host system that is external to memory sub-system 110. A location of the host system can be inside the host system (e.g., within a PC or server) or can be outside the host system (e.g., over a computer network). The external location can include a location in primary storage of the host system (e.g., main memory 225), secondary storage of the host system (e.g., another memory sub-system, hard disk drive (HDD)), storage outside the host system (e.g., network attached storage (NAS), storage area network (SAN)), a processor of the host system (e.g., CPU, GPU, Network Adapter), other location, or a combination thereof.

The locations can be determined by memory sub-system 110 or host system 120 and be based on input data of the host system, memory sub-system, other system, or a combination thereof. Memory sub-system 110 can receive data from the host system that indicates one or more of the locations. In one example, the host system can provide an external location (e.g., target location) to memory sub-system 110 and memory sub-system 110 can transmit data to the external location. In another example, host system can provide an internal location (e.g., source location) without providing a particular external location and the memory sub-system 110 can respond to the host system by transmitting (e.g., responding, replying) with the data, which can be similar to a traditional access request (e.g., read request). In yet another example, host system can provide both an internal location and an external location to the memory sub-system 110 and memory sub-system 110 can copy or move (e.g., relocate) the data from the internal location to the external location.

Memory sub-system 110 can transmit data to an external location of the host system with or without transmitting it to the CPU of the host system. In one example, memory sub-system 110 can transmit data over a communication channel to the CPU of the host system where it is temporarily stored by the CPU as it is transferred to the external location. In another example, memory sub-system 110 can transmit data over a communication channel to the external location without transmitting the data to the CPU and therefore avoiding the CPU from having to temporarily store the data. This latter example can use technology that is the same or similar to Direct Memory Access (DMA), Data Direct Input/Output (DDIO), Remote Direct Access Memory (RDMA), other I/O acceleration technology, or a combination thereof.

Direct memory access is a feature of some host systems and enables certain hardware sub-systems to access memory of the host system (e.g., main memory 225) independent of the central processing unit (CPU). The hardware sub-systems can include one or more memory sub-systems (e.g., SSD controllers), hard disk drive (HDD) controllers, network interface controllers (NIC), graphics controller, sound cards, other hardware devices, or a combination thereof. The host system and/or memory sub-system can enable the transmission of data using direct memory access. Without DMA, the CPU temporally stores the transmitted data (e.g., an ephemeral copy) when using programmed input/output and is typically occupied for the entire duration of a read or write operation. With DMA, the CPU can configure one or more hardware sub-systems to access the storage location of the host system and/or other host system and can enable the CPU to do other operations while the data is being transferred. This feature is particularly useful when a lot of data is being transferred and the CPU cannot keep up with the rate of data transfer. DMA can offload expensive memory operations, such as large copies, from the CPU to the other hardware sub-systems and the CPU can subsequently receive an interrupt when the operations are complete. Remote direct memory access (RDMA) is a form of direct memory access in which one of the hardware systems internal to the host machine can transfer data to a location outside of the host system transmitting the data through the CPU. This can be done by enabling the hardware sub-system (e.g., memory sub-system 110) to transmit the data to memory of the network interface controller (e.g., network adapter, network card), which can transmit the data over a network to a device outside of the host system (e.g., NAS, SAN, remote host system).

Instruction receiving module 426 can enable memory sub-system 110 to receive and process an instruction indicating whether or not to continue operation at a reduced capacity. The capacity of memory sub-system 110 can be reduced before, during, or after receiving the instruction. In one example, the capacity could have been reduced before receiving the instruction and the instruction can cause the memory sub-system to continue operating at the reduced capacity. In another example, the capacity could have remained the same after detecting the error and the instruction can cause the memory sub-system to reduce the capacity and continue at the reduced capacity. This can occur when memory sub-system 110 detects the failure and is able to temporarily avoid the reduction in capacity. This can involve delaying the reduction (e.g., delay downshifting the multi-level cells) or temporarily compensating for any reduction in capacity by using internal space (e.g., reduce overprovisioning or redundant storage), compressing existing data, relocating data, other operation, or a combination thereof. In either example, the instruction can cause the memory sub-system 110 to eventually operate at the reduced capacity.

The instruction can include one or more instructions, commands, signals, messages, machine code, operations, opcodes, or a combination thereof. The instruction can be associated with data (e.g., instruction data or content) that functions as an indication on whether to change the capacity (e.g., reduce the capacity) or to continue or discontinue operating at a previously changed capacity. In one example, the data can indicate one or more capacities and can include an original capacity (1 TB), a new capacity (900 GB), an incremental change to the capacity (e.g., reduce by 100 GB), other capacity value, or a combination thereof. In another example, the data can indicate a binary response (yes/no, true/false) regarding whether to proceed with changing the capacity or operating at the changed capacity. In either example, memory sub-system 110 can respond to the instruction by executing capacity updating component 216.

Capacity updating component 216 can enable memory sub-system 110 to update its configuration in response to a failure. This can involve updating the set of memory devices and one or more data structures in view of a changed capacity. As discussed above, the capacity can correspond to the portion of storage space that is externally available to the host system and can be a subset of the total storage space of memory sub-system 110 because a portion of the storage space can be used for internal use. Capacity updating component 216 can execute one or more times in response to detecting a particular failure and can to reduce the capacity, keep the capacity constant, or increase the capacity. In one example, capacity updating component 216 can configure memory sub-system 110 to operate at a reduced capacity in response to a failure. In another example, capacity updating component 216 can temporarily minimize the capacity reduction (e.g., keep the capacity constant) after detecting the failure and can then subsequently reduce the capacity for long term operation. As discussed above, temporarily minimizing or avoiding a capacity reduction can involve delaying the capacity reduction by temporarily using internal use storage space, by compressing the stored data, by postponing the downsizing of multi-level cells, or by using parity data to provide read access to the inaccessible data. Delaying the capacity reduction can enable the host system to analyze and react to the failure and an impending or existing reduction in capacity. In one example, capacity updating component 216 can include a locking module 430, a capacity reduction module 432, a rebuilding module 434, other modules, or a combination thereof.

Locking module 430 enables memory sub-system 110 to restrict access of the host system to a portion of memory sub-system 110. Locking module 430 can restrict access by adding (e.g., creating, generating, applying, activating), removing (e.g., deleting, destroying, deactivating), modifying (e.g., editing, updating), or enforcing one or more locks. The locks can restrict access by disabling (e.g., prohibiting, blocking, stopping, closing) or enabling (e.g., allowing, permitting, authorizing) one or more different types of access, such as read access, write access, other access, or a combination thereof. The locks can include one or more read locks, write locks, or other locks. The read lock can disable the host system from having both read access and write access to the portion of the memory sub-system that the lock corresponds to (e.g., is applied to). The write lock can disable the host system from having write access while enabling the host system to have read access.

The locks can be initiated by memory sub-system 110 or by host system 120 and can apply to a particular portion of memory sub-system 110 or host system 120. For example, a lock can apply to one or more memory sub-systems, memory devices, zones, blocks, memory cells, dies, packages, communication channels, connectors, interconnects, other portion of a memory sub-system, or a combination thereof. The locks can restrict access of any or all portions or combination of portions of host system. The restricted access can apply to some or all processes (e.g., kernel, hypervisor, application, file system), processors (e.g., CPU/GPU), hardware sub-systems (graphics card, network interface), other portion of a host system, or a combination thereof.

Locking module 430 can apply a lock to a portion of memory sub-system that is affected by the failure (e.g., failed portion). The portion being locked can be the same, smaller, or larger than the particular portion affected by the failure. This can occur when the granularity to which a lock can apply is different from the portion affected by the failure. For example, the lock can apply to an entire die or zone even though a small portion of the die or zone was affected by the failure. The term failed portion can refer to the particular portion that is affected by the failure or to a larger portion that includes a portion that was not affected by the failure. In one example, locking module can apply a write lock to the portion affected by the failure and the write lock can disable the host system's ability to write data to the portion but enable the host system to read data for the portion. Some of the data can be inaccessible due to the failure and can be recovered by the memory sub-system 110.

Capacity reduction module 432 enables memory sub-system 110 to update the configuration of the memory sub-system 110 to reduce the capacity. Updating the configuration can involve executing one or more deactivation operations, truncating operations, downshifting operations, or a combination thereof. The deactivation operations can involve deactivating one or more of the failed portions so they are no longer represented as being available to store data (e.g., external data and/or internal data). The deactivating can be the same or similar to marking, unmapping, disabling, closing, removing, deleting, destroying, blocking, labeling, erasing, wiping, other action, or a combination thereof. The truncating operation can involve redistributing the storage and reducing the total capacity by deleting a predetermined amount at the beginning, middle, or end of a storage space (e.g., internally or externally accessible address space). The predetermined amount can be based on the amount of storage space affected by the failure and can be the same, smaller, bigger than the amount of failed storage space.

The downsizing operation can also or alternatively be used to reduce the capacity. As discussed above, the memory sub-system 110 can include multi-level cells (MLC) that store more than one bit of information per memory cell. The downsizing operation can reconfigure the memory sub-system 110 and one or more of the memory devices to reduce the quantity of bits stored per memory cell from a first size (e.g., larger size, original size) to a second size (e.g., smaller size, reduced size). The first and second sizes of the memory cells can include single-level cells (SLC), double-level cells (DLC), triple-level cells (TLC), quad-level cells (QLC), penta-level cell (PLC), other size cell, or a combination thereof. Each downsizing can decrease the memory cells one or more levels and the downsizing can be repeated multiple times until the multi-level cells become single-level cells or are decommissioned.

The operations to update the configuration can apply to any portion of the memory sub-system. The operations can be applied to a target portion of one or more particular memory cells, blocks, zones, dies, chip, chipset, packages, other devices, or a combination thereof. The operations can affect the target portion that is affected by the failure and one or more other portions of memory sub-system 110. Executing the operation on the target portion can cause some or all of the other portions of memory sub-system to be updated (e.g., remapped, renumbered, relabeled. re-zoned re-indexed). In one example, an operation on the target portion can cause portions before and after (e.g., all other portions) to be updated. In another example, an operation on the target portion can cause subsequent portions to be updated without the prior portions being updated. In either example, the operations can reduce the capacity by reconfiguring the memory sub-system.

Rebuilding module 434 enables memory sub-system 110 to update the data stored by memory sub-system based on the reduced capacity (e.g., new configuration). Updating the data can involve adding data, removing data, or changing data of one or more data structures. The data can correspond to the capacity and can include pointer data (starting addresses), mapping data (e.g., logical to physical mapping), table data, index data, other data, or a combination thereof. In one example, this can involve regenerating recovery data (e.g., parity data), compressing data, encrypting data, or a combination thereof.

The components and modules of FIG. 4 can be a superset or a subset of what is included in a particular embodiment of memory sub-system 110. In the example discussed above, the memory sub-system 110 may include all of the components and modules. In other examples, memory sub-system 110 can be absent features of the data recovery module 422, data relocation module 424, rebuilding module 434, inventory module 412, or other module and can be performed by another device as discussed below in regards to host system 120 or may be unnecessary for a particular embodiment.

Figure 5:
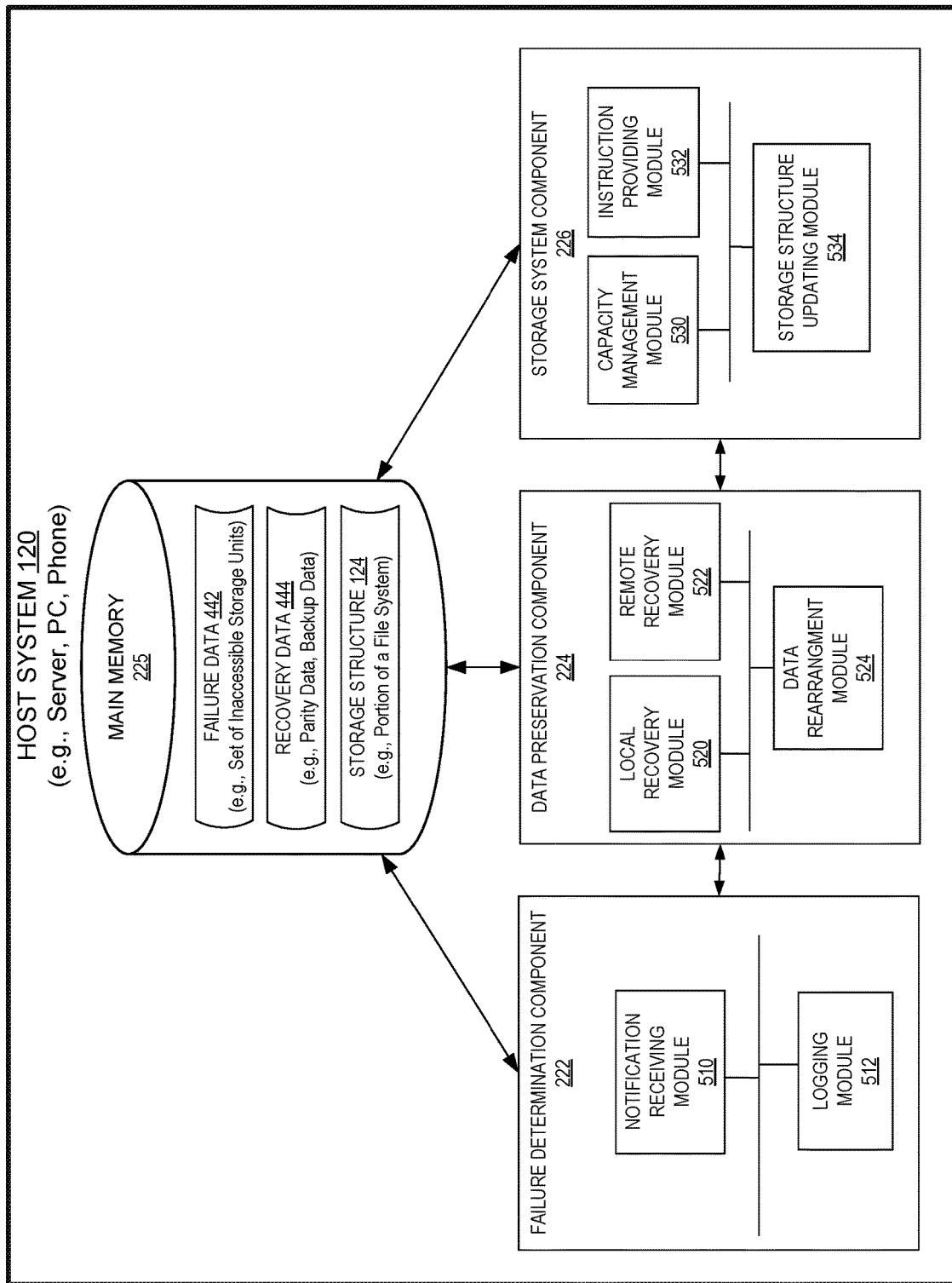
FIG. 5 is a detailed block diagram of a host system, in accordance with some embodiments of the present disclosure.

FIG. 5 is a block diagram illustrating exemplary components of host system 120 that is connected with the memory sub-system of FIG. 4 using one or more communication channels (not shown). The features discussed in regards to the components and modules in FIG. 5 can be implemented in computer code (e.g., firmware, software, or other computer program) or hardware (e.g., circuitry) of host system 120 or memory sub-system 110. More or less components or modules can be included without loss of generality. For example, two or more of the components can be combined into a single component, or features of a component can be divided into two or more components. In the example illustrated, host system 120 can be the same or similar to the host system 120 of FIG. 1-2 and can include a failure determination component 222, a data preservation component 224, and a storage system component 226. In other examples, host system 120 can be absent features of the local recovery module 520, remote recovery module 522, or other module and can rely on another device (e.g., memory sub-system 110) to perform the features or the features can be absent for a particular embodiment.

Failure determination component 222 enables host system 120 to determine and inventory failures affecting the capacity of the memory sub-system 110. As discussed above, a failure can affect stored data or the ability to access the stored data and can be associated with any portion of memory sub-system 110, such as one or more of the memory devices, controllers, connectors, interfaces, etc. In one example, failure determination component 222 can include a notification receiving module 510 and a logging module 512.

Notification receiving module 510 enables host system 120 to receive notifications about a failure from memory sub-system 110. The notifications can enable the host system to determine that the memory sub-system has encountered a failure that reduces the storage capacity of a memory sub-system. The notifications can be generated by the memory sub-system and indicate an existence of a failure, a type of failure, a portion of the memory sub-system affected by the failure, other information, or a combination thereof. The notifications can be in the form of a message (e.g., message 229A) that is sent by memory sub-system 110 and transmitted over a communication channel to host system 120. Notification receiving module 510 can receive one or more messages that correspond to the same failure. A first message can notify the host system that a failure exists (e.g., occurred, is present) and can optionally include an indication that the capacity of the memory sub-system has been reduced. The indication can include one or more values that indicate whether the capacity changed (e.g., binary yes/no), that indicate the amount the capacity changed (e.g., 100 GB lost), that indicate the amount of data affected (e.g., external data and/or internal data), that indicate a new capacity, other value, or a combination thereof. A second message can notify the host system of a set of one or more storage units that are affected by the failure. The set of storage units can be a set of blocks (e.g., logical block addresses), zones (e.g., zone identifiers), devices (e.g., dies, packages), other unit, or a combination thereof. The set of storage units can correspond to a single memory device or different memory devices. The second message or a subsequent message can also or alternatively indicate whether data affected by the failure can or cannot be accessed, corrected, or recovered. The first message and the second message can be consolidated into a single message or be spread across more messages.

Logging module 512 enables host system 120 to log the failures by updating an inventory with data related to the failures. The data related to the failures can be stored in main memory 225 as failure data 442. Failure data 442 can be the same or similar to failure data 442 of FIG. 4 and can be received from the memory sub-system 110 or generated, supplemented, aggregated, or augmented by host system 120. Failure data 442 can be health data that includes data identifying or describing the effects of failures, causes of failures, indications of failure, other aspect of failures, or a combination thereof. The effects of failures can be the results and/or response to the failures and can correspond to a set of storage units (e.g., blocks, zones, memory devices, controllers, other portion of memory sub-system 110, or a combination thereof). In one example, logging module 512 can receive or generate the set of one or more storage units that have been affected by the failures and store it as failure data 442. The set can be referred to as the failed set, inaccessible set, defective set, malfunctioning set, faulty set, or other term. The cause of the failures can also be recorded (e.g., inventoried) and can relate to temperature (e.g., extreme heat or cold), humidity (e.g., wetness or dryness), electricity (e.g., leakage, current or voltage surge, short circuit, electrostatic discharge), magnetism (e.g., magnetic field, magnetic force), electromagnetism (e.g., electromagnetic inference (EMI), electromagnetic radiation (EMR)), other cause, or a combination thereof.

Data preservation component 224 enables host system 120 to enhance the preservation of data on a memory sub-system when the capacity of the memory sub-system has been reduced. In the past, host systems would respond to memory sub-system failures by indicating the memory sub-system should be replaced or by reformatting the memory sub-system to operate at a lower capacity. Reformatting the memory sub-system is a resource intensive operation that can remove data of the memory sub-system and consumes a large amount of time, processing power, temporary storage space, I/O, and other valuable resources. Data preservation component 224 can enhance the preservation of data by keeping the data that survives the failure and optionally correcting or recovering data affected by the failure. In the example shown in FIG. 5, data preservation component 224 can include a local recovery module 520, a remote recovery module 522, and a data rearrangement module 524.

Local recovery module 520 enables host system 120 to recover data affected by the failure of the memory sub-system using resources that are local to the host system 120. Resources that are local to host system 120 can include any hardware, software, or data that is internal to host system 120 A resource is internal to host system 120 when it is included within a computer enclosure of host system 120 (e.g., computer chassis, case, cabinet, frame, rack, blade). This can include primary data storage devices (e.g., main memory), secondary data storage devices (e.g., memory sub-system 110, HDD), other devices, or a combination thereof. In one example, local recovery module 520 can recover data affected by the failure (e.g., missing data) by accessing the data from back-up, accessing the data from an original source, generating the missing data using recovery data, other recovery mechanism, or a combination thereof. In another example, local recovery module 520 can cause memory sub-system to recover the data affected by the failure, as discussed above in regards to data recovery module 422 of FIG. 4. The host system 120 can request access to data affected by the failure and the memory sub-system can generate it before, during, or after the host system 120 requests it. The memory sub-system can indicate to the host system that the data was recovered or can avoid the indication and perform the data recovery transparent to host system 120. In some situations, local recovery module 520 can be unable to recover the data affected by the failure of memory sub-system and can use remote recovery module 522.

Remote recovery module 522 enables host system 120 to recover data affected by the failure by using one or more resources that are remote from the host system 120. Resources that are remote from host system 120 can include any hardware, software, or data that is external to the computer enclosure of host system 120. This includes resources that are communicable coupled to host system 120 using one or more wires, cables, connector, computer network (e.g., LAN, WAN, Internet), or a combination thereof. In one example, remote recovery module 522 can recover the data affected by the failure by accessing the data from another host system. Host system 120 and the other host system can be nodes in a storage distribution network, they could have related replicas or a back-up, peers in a cluster, other relationship, or a combination thereof.

Data rearrangement module 524 can enable host system 120 to rearrange data on memory sub-system 110, host system 120, or a combination thereof. Rearranging data can involve one or more operations that include read, write, move, copy, duplicate, deduplicate, encrypt, decrypt, compress, decompress, other operation, or a combination thereof. Data rearrangement module 524 can copy data from a first location (e.g., original location, source location) to one or more second locations (e.g., new location, destination location, target location). The first and second locations can be in volatile or non-volatile storage and can be internal locations that are internal to the memory sub-system 110, external locations that are external to the memory sub-system 110, or a combination thereof. The external locations can include a location inside the host system (e.g., within computer enclosure) or can be outside host system 120 (e.g., over network). The external location can include a location in primary storage of the host system (e.g., main memory), secondary storage of the host system (e.g., another memory sub-system, hard disk drive (HDD)), storage outside the host system (e.g., network attached storage (NAS), storage area network (SAN)), a processor of the host system (e.g., CPU, GPU, Network Adapter), other location, or a combination thereof.

The locations can be determined based on data of host system 120, the memory sub-system, other system or device, or a combination thereof. Host system can provide data to memory sub-system that indicates one or more of the locations. In one example, host system 120 can provide an external location (e.g., target location) to the memory sub-system and the memory sub-system can transmit data to the external location. In another example, host system can provide an internal location (e.g., source location) without providing a particular external location and the memory sub-system can return data at the internal location, which can be similar to a traditional access request (e.g., read request). In yet another example, host system 120 can provide both an internal location and an external location to the memory sub-system and the memory sub-system can copy or move (e.g., relocate) the data from the internal location to the external location.

Host system 120 can configure direct memory access (DMA) so that the memory sub-system can transmit data to an external location of the host system without transmitting it to the CPU of the host system. DMA can be particularly advantageous because data rearrangement module 524 can be arranging very large quantities of data (e.g., 100 GB-1 TB) and the data transmission can be performed with little to no involvement of the CPU that is managing the transmissions. The CPU can configure the DMA feature and listen for a signal (e.g., trap) to determine when a transfer is complete. DMA is discussed in more detail above, in regards to the data relocation module 424 of memory sub-system 110 in FIG. 4.

Storage system component 226 can enable host system 120 to adapt to a reduction in the capacity of the memory sub-system by reconfiguring the storage system of host system 120. The storage system can be any data storage system and can be a file system, database system, distributed storage system, virtual storage system, other storage system, or a combination thereof. The storage system can be managed by code executed as part of a kernel, a device driver, an application, other portion of a host operating system, or a combination thereof. In the example shown in FIG. 5, storage system component 226 can include a capacity management module 530, an instruction providing module 532, and a storage structure updating module 534.

Capacity management module 530 can enable host system 120 to determine and control the capacity of the memory sub-system 110 before, during, or after a failure. As discussed above, the capacity can be a storage capacity that is based on the storage size of a set of one or more memory devices. The storage capacity can be less than the storage size of the set and can depend on the amount of storage space used for internal use (e.g., internal data and data structures). Determining the capacity can involve communicating with the memory sub-system and determining or controlling the memory sub-system use of over provisioning, wear leveling, error detection, error correction, recovery, redundancy, garbage collection, compression, encryption, other feature, or a combination thereof. In one example, capacity management module 530 can determine (e.g., calculate, detect) the change in capacity or the new capacity (e.g., reduced capacity) based on data received from the memory sub-system.

Capacity management module 530 can enable host system 120 to perform functions that are the same or similar to those discussed above in regards to the capacity determination module 414 of the memory sub-system. For example, the host system 120 can determine one or more failure induced capacities. When determining a failure induced capacity, there can be a tradeoff between capacity and one or more other features of the memory sub-system, such as, performance, reliability, recoverability, other features, or a combination thereof (e.g., inverse relationship between capacity and overprovisioning). A first failure induced capacity can correspond to a capacity that keeps the other features constant or substantially constant (e.g., with 5% of original). For example, the first failure induced capacity can be for a reduced capacity (e.g., 10% reduction) that keeps the storage space available for internal use constant (e.g., same amount or proportion), which minimizes or eliminates any reduction in space used for overprovisioning and parity data. A second value can correspond to a capacity that minimizes the change to the capacity at the cost of the other features (e.g., performance and recoverability is reduced). For example, this failure induced capacity can minimize the reduction in capacity (e.g., 1% reduction) by allowing for a greater reduction in the storage space available for internal use, which adversely affects overprovisioning, parity data, or other internal use. In one example, the one or more failure induced capacities can be calculated using one or more mathematical functions (e.g., equations, formulas) that represent relationships between the features (e.g., feature tradeoffs). The mathematical function can be solved so that one or more of the features are maximized, minimized, or remain constant.

Instruction providing module 532 can enable host system 120 to instruct the memory sub-system to operate at a reduced capacity and to retain data of the storage system. The instruction can be transmitted after the failure is detected and before, during, or after the memory sub-system has been reconfigured to operate at the reduced capacity. In one example, the memory sub-system can notify the host system 120 and wait for host system 120 to provide the instruction before reconfiguring the memory sub-system for the reduced capacity. In another example, the memory sub-system can begin the process to reduce the capacity before the host system provides the instruction and before, during, or after host system 120 is notified of the failure.

The instruction can be generated by host system 120 and include or be associated with content (e.g., data). The instruction can include one or more separate or combined instructions, commands, signals, messages, machine code, operations, opcodes, or a combination thereof. The content can function as an indication of whether to change the capacity (e.g., reduce the capacity) or to continue or discontinue operating at a previously changed capacity. In one example, the data can indicate a binary response (yes/no, true/false) regarding whether to proceed with changing the capacity or operating at the changed capacity. In one example, the data can indicate one or more capacities and can include an original capacity (1 TB), a new capacity (900 GB), an incremental change to the capacity (e.g., reduce by 100 GB), other capacity value, or a combination thereof. In either example, host system 120 can transmit the instruction and update storage structure 124 using storage structure updating module 534.

Storage structure updating module 534 can enable host system 120 to adapt to a reduction in the capacity of the memory sub-system by configuring (e.g., reconfiguring) the storage structure 124 of the storage system. Storage structure updating module 534 can execute as one or more system processes (e.g., kernel processes), user processes (e.g., application processes), or a combination thereof. Storage structure 124 can include one or more data structures that are used to manage the storage and retrieval of data from one or more memory sub-systems. Storage structure 124 can include data structures and rules used to organize the data and can involve separating the data into storage units that that can be individually identified and accessed. Some or all of storage structure 124 can be stored in main memory 225, memory sub-system 110, other primary or secondary storage, or a combination thereof. In one example, storage structure 124 can be a file system as discussed in more detail below.

File system can include multiple layers and the multiple layers can include a logical file system (e.g., logical layer), a virtual file system (e.g., virtual layer), a physical file system (e.g., physical layer), other layer, or a combination thereof. The logical file system can manage interactions with applications and can provide an application program interface (e.g., file system API) that exposes file system operations (e.g., open, close, create, delete, read, write, execute) to other computer programs. The logical layer of the file system can manage security and permissions and maintain open file table entries and per-process file descriptors. The logical file system can pass requested operations (e.g., write requests) to one or more other layers for processing. The virtual file system can enable the host operating system to support multiple concurrent instances of physical file systems, each of which can be referred to as a file system implementation. The physical file system can manage the physical operation of the storage device (e.g. memory sub-system 110). The physical file system can handle buffering and manage main memory and can be responsible for the physical placement of storage units in specific locations on memory devices 130A-Z. The physical file system can include device mapping logic and can interact with device drivers (e.g., SSD driver) or with the channel to interact with memory sub-system 110. One or more of the file system layers can be explicitly separated or can be combined together in order to store file system data.

The file system data can be any data associated with the file system and can include data received by the file system (e.g., user data) or data generated by the file system. The file system data can represent data of one or more external file system objects, internal file system objects, or a combination thereof. The external file system objects can be file system objects that are externally accessible by a computer program (e.g., applications) using the file system API. The external file system objects can include files (e.g., file data and metadata), directories (e.g., folders), links (e.g., soft links, hard links), or other objects. The internal file system objects can be file system objects that remain internal to the file system and are inaccessible using the file system API. The internal file system objects can include storage tree objects (e.g., extent map, extent tree, block tree), stream objects (e.g., stream identifiers), file group data (e.g., group of similar files), storage units, block groups, extents, or other internal data structures.

Each file system object can be associated with object data and object metadata. The object data can be the content of the object (e.g., file data) and the object metadata can be information about the object (e.g., file metadata). The object metadata can indicate attributes of the object such as a storage location (e.g., zone, block group, storage unit), data source (e.g., stream, application, user), data type (e.g., text, image, audio, video), size (e.g., file size, directory size), time (e.g., creation time, modification time, access time), ownership (e.g., user ID, group ID), permissions (e.g., read, write, execute), file system location (e.g., parent directory, absolute path, local path), other attribute, or a combination thereof. In one example, the file system data can include data for a new file and the new file can include file data and file metadata. The file data can include the content of the file (e.g., image content, audio content) and the file metadata can include one or more attributes of the content (e.g., identifier corresponding to a zone z, stream s, and/or application a).

The object data and object metadata (e.g., attributes, tree nodes) can be stored together in the same data structure at the same storage location or can be stored separately in different data structures at different storage locations. For example, storage structure 124 can store the object metadata in an index node (e.g., inode) data structure and the index node data structure can have one or more pointers to the object data. The inode can be a data structure in a Unix-style file system that describes a file system object. Each inode can indicate the attributes and storage locations (e.g., block addresses) of the data of the file system object. A directory can be represented as an inode and can contain an entry for itself, its parent (e.g., parent directory), and each of its children (e.g., child directories or files).

File system can divide allocated space into block groups which can be variable-sized allocation regions. The allocation regions can be used to store object metadata (e.g., extent tree node, inodes) and object data (e.g., file content, extents). A block group (BG) can be understood as a contiguous portion a file system object (e.g., a series of LBAs) that is allocated to a contiguous area of a memory device and is reserved for file system data of the file system. This contiguous area can be represented as a range of block numbers (e.g., physical addresses). Larger files can be partitioned into the block groups that are individually tracked to make allocation and management of the files feasible over a necessary series of allocation and writes to memory devices 130A-Z. The default ratio of object data to object metadata can be 1:2. They are intended to use concepts of the Orlov block allocator to allocate related file system objects together and resist fragmentation by leaving free space between groups. (Ext3 block groups, however, have fixed locations computed from the size of the file system, whereas those in b-tree file system are dynamic and created as needed.) Each block group can be associated with a block group identifier (e.g., block group item). Inodes in the file system tree can include a reference to a corresponding block group (e.g., pointer to storage unit).

Figure 6:
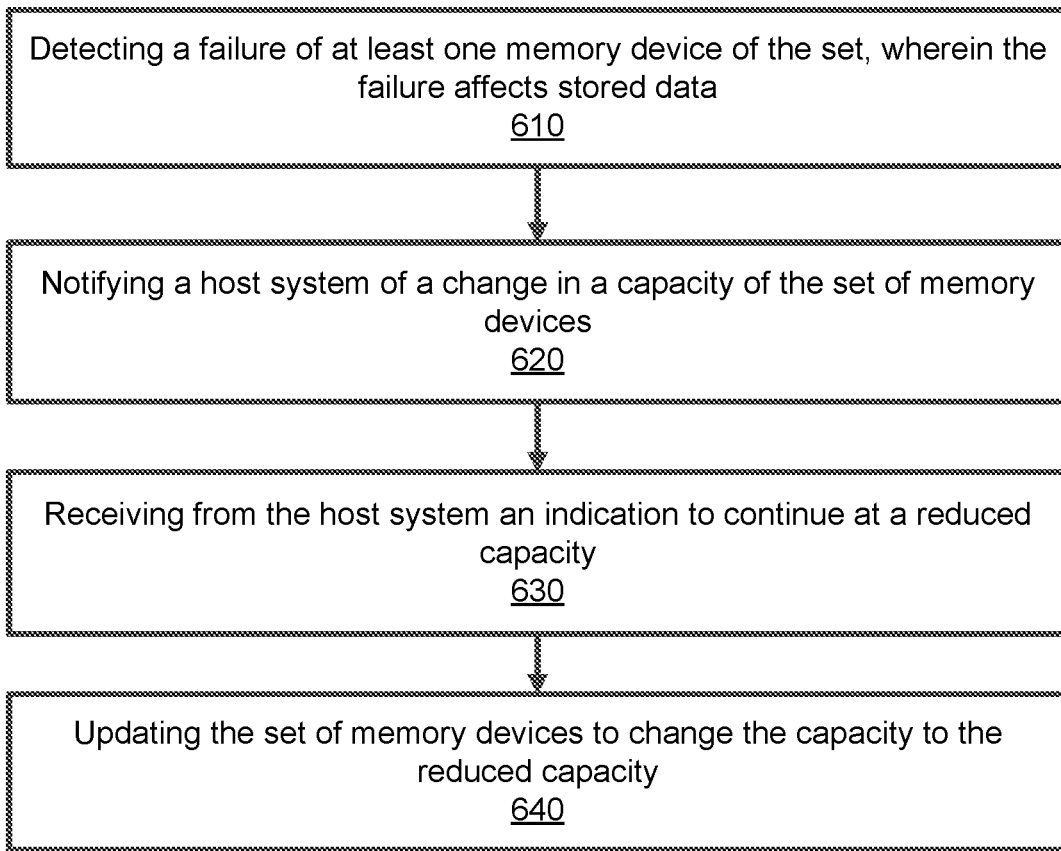
FIG. 6 is a flow chart of a method executed by the memory sub-system to manage a reduction of capacity, in accordance with some embodiments of the present disclosure.

FIG. 6 is a flow chart of a method 600 that is executed by a memory sub-system to manage a reduction to the capacity of the memory sub-system, according to an embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic can detect a failure of at least one memory device of the set, wherein the failure affects stored data. In one example, the memory sub-system is a solid state drive (SSD) and the processing device is a memory controller of the solid state drive. In one example, the processing device can detect multiple failures that occur at different times and affect different memory devices of the set.

At operation 620, the processing logic can notify a host system, such as host system 120, of a change in a capacity of the set of memory devices, such as memory devices 130A-130Z. The notifying can involve transmitting a first message to the host system to indicate the failure and transmitting a second message to the host system to indicate a set of storage units affected by the failure. The first message and/or second message are Asynchronous Event Notification (AEN) messages. In one example, the processing device can notify the host system after each of failure and reduce the capacity after each of the failures.

At operation 630, the processing logic can receive from the host system an indication to continue at a reduced capacity. In one example, the operations can involve determining whether the capacity after a second failure satisfies a threshold capacity. The threshold capacity can be a predetermined minimum capacity for the set of memory devices. Responsive to the threshold capacity being satisfied, the processing device can indicate to the host system that the set of memory devices is operable at a reduced capacity. Responsive to the threshold capacity being unsatisfied, the processing device can indicate to the host system that the set of memory devices is inoperable.

At operation 640, the processing logic can update the set of memory devices to change the capacity to the reduced capacity. This can involve locking a failed portion of the at least one memory device. The locking can include a write lock that enables reads by the host system and disables writes by the host system. In one example, the processing device can provide the host system with data that is recovered in response to a read request of the host system to the failed portion. The processing device can also or alternatively delete data of the at least one memory device and generate recovery data for the set of memory devices based on the reduced capacity. In other examples of method 600, the operations can include recovering the stored data affected by the one or more failures using recovery data that is stored in the set of memory devices.

Figure 7:
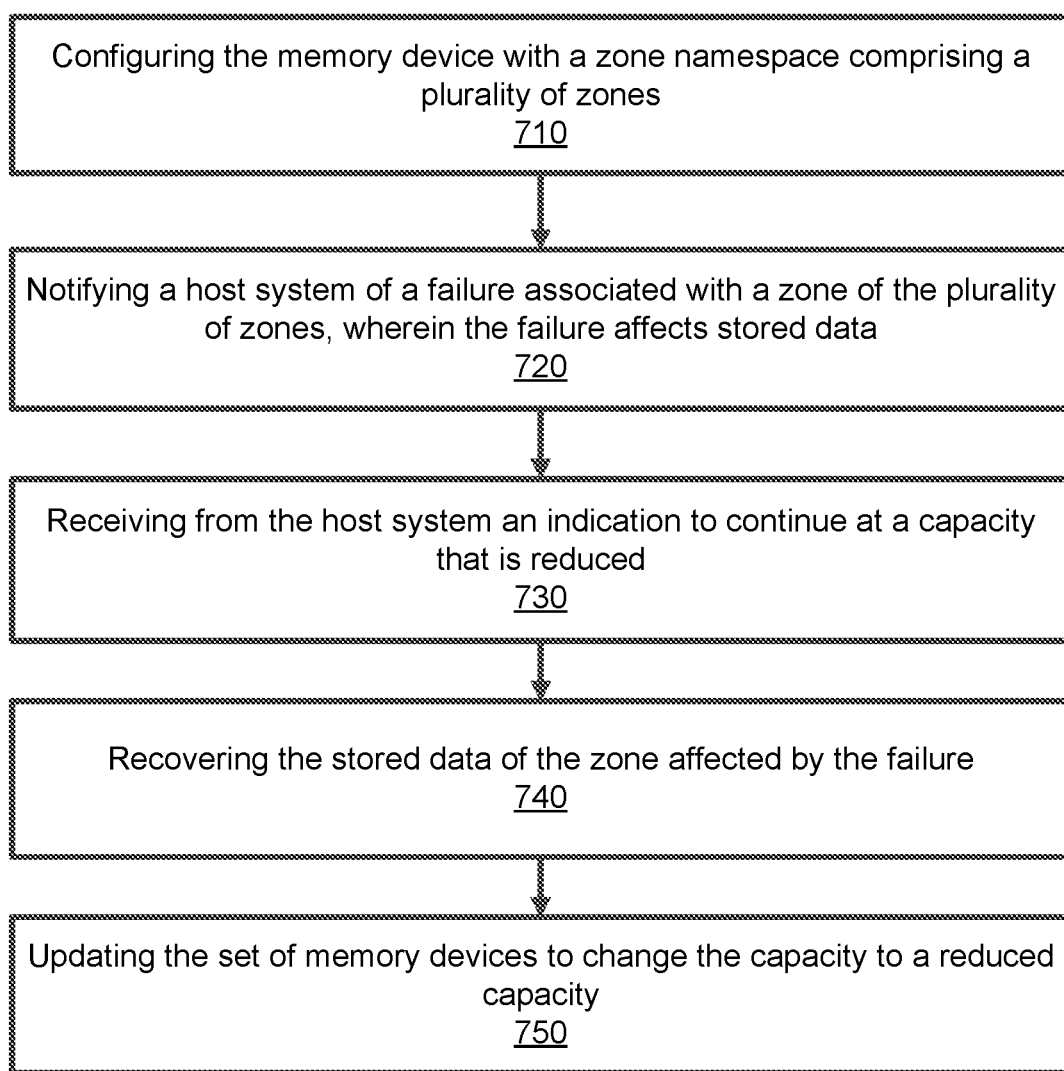
FIG. 7 is a flow chart of another method executed by the memory sub-system to manage a reduction of capacity, in accordance with some embodiments of the present disclosure.

FIG. 7 is a flow chart of a method 700 that is executed by a memory sub-system to manage a reduction to the capacity of the memory sub-system, according to an embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic can configure the memory device with a zoned namespace that includes multiple zones. The zoned namespace can be a sequential namespace that is defined by the NVM Express™ (NVMe™) organization. In a zoned namespace, the address space of each of the memory devices can be divided into one or more zones. Each of the zones can be a contiguous or non-contiguous portion of a memory device (e.g., range of blocks) that is identified and managed as a single storage unit. Each zone can correspond to zone identification data that can be used to uniquely identify the zone and can be the same or similar to a zone identifier (zone ID), a zone descriptor, a zone label, or other term. A zone can be a memory storage unit (e.g., memory unit) and can have a predefined size that can be based on (e.g. a multiple of) a size of another memory storage unit (e.g., block, cell, page, die, device, or sub-system). In one example, the memory sub-system is a solid state drive (SSD) and the processing device is a memory controller of the solid state drive.

At operation 720, the processing logic can notify a host system of a failure associated with a zone of the multiple zones and the failure can affect stored data. In one example, the notifying can involve transmitting a message that indicates to the host system a set of one or more zones of the memory devices that are affected by the failure.

At operation 730, the processing logic can receive from the host system an indication to continue at a capacity that is reduced. In one example, the processing device can also or alternatively indicate to the host system that the capacity of the set of memory devices is unable to store recovered data. The processing device can receive, from the host system, a storage location to store the recovered data. The storage location can be in main memory of the host system.

At operation 740, the processing logic can recover the stored data of the zone affected by the failure. The recovering of stored data can involve accessing recovery data (e.g., parity data) stored by the memory device and generating the stored data affected by the failure based on the recovery data.

At operation 750, the processing logic can update the set of memory devices to change the capacity to a reduced capacity. The updating can involve locking the zone associated with the failure of the at least one memory device. The locking can use a write lock that enables reads by the host system and disables writes by the host system. The processing device can provide the host system with data that is recovered in response to a read request for the zone. The processing device can also update the zoned namespace to reduce the capacity, which can involve deactivating the zone and deleting all the data in the zone. The processing device can generate recovery data for the set of memory devices based on the reduced capacity.

Figure 8:
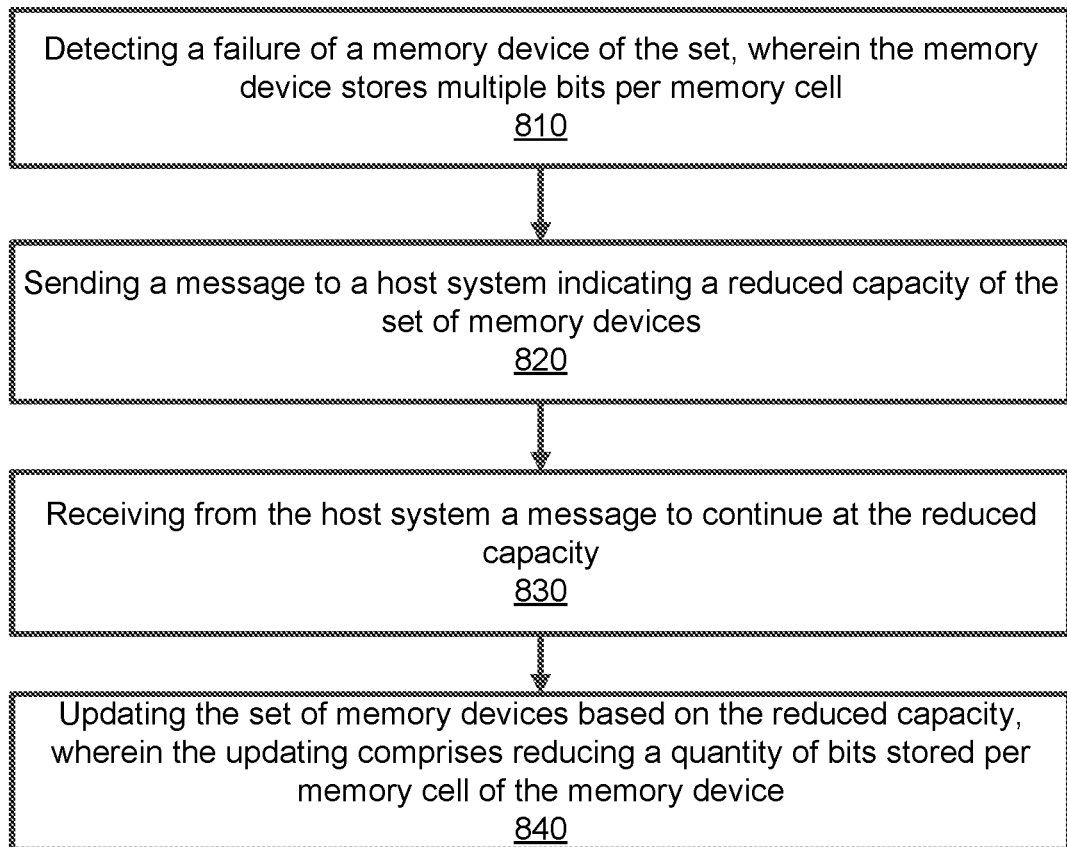
FIG. 8 is a flow chart of another method executed by the memory sub-system to manage a reduction of capacity, in accordance with some embodiments of the present disclosure.

FIG. 8 is a flow chart of a method 800 that is executed by a memory sub-system to manage a reduction to the capacity of the memory sub-system, according to an embodiment. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic can detect a failure of a memory device that stores multiple bits per memory cell. Detecting the failure can involve calculating a reliability measurement based on an ability of the memory device to store the multiple bits per memory cell. The processing device can determine that the failure exists responsive to comparing the reliability measurement and a predetermined threshold value. In one example, the memory sub-system is a solid state drive (SSD) and the processing device is a memory controller of the solid state drive.

At operation 820, the processing logic can send a message to a host system indicating a reduced capacity of the set of memory devices. Sending the message can involve sending a first message to the host system to indicate the failure and sending a second message to the host system to indicate a set of storage units affected by the failure. The first message and/or second message can be Asynchronous Event Notification (AEN) messages.

At operation 830, the processing logic can receive from the host system a message to continue at the reduced capacity. In one example, the processing device can indicate to the host system that the set of memory devices includes data in excess of the reduced capacity. The processing device can receive from the host system a storage location to store the recovered data and provide the data in excess of the reduced capacity to the storage location. The storage location can be in main memory of the host system or at another location.

At operation 840, the processing logic can update the set of memory devices based on the reduced capacity. The updating involves reducing the quantity of bits stored per memory cell of one or more memory devices of the set. In one example, the memory device includes (e.g., is made up of) Multi-Level Cells (MLC) and reducing the quantity of bits stored per memory cell involves downshifting Quad-Level Cells (QLC) to Triple-Level Cells (TLC).

Method 800 can also or alternatively involve the processing device detecting a second failure of the same memory device. The second failure can be detected based on an inability of the memory device to store the reduced quantity of bits per memory cell. The processing device my respond to the second failure by updating the set of memory devices to further reduce the quantity of bits stored per memory cell of the memory device (e.g., from TLC to SLC).

Figure 9:
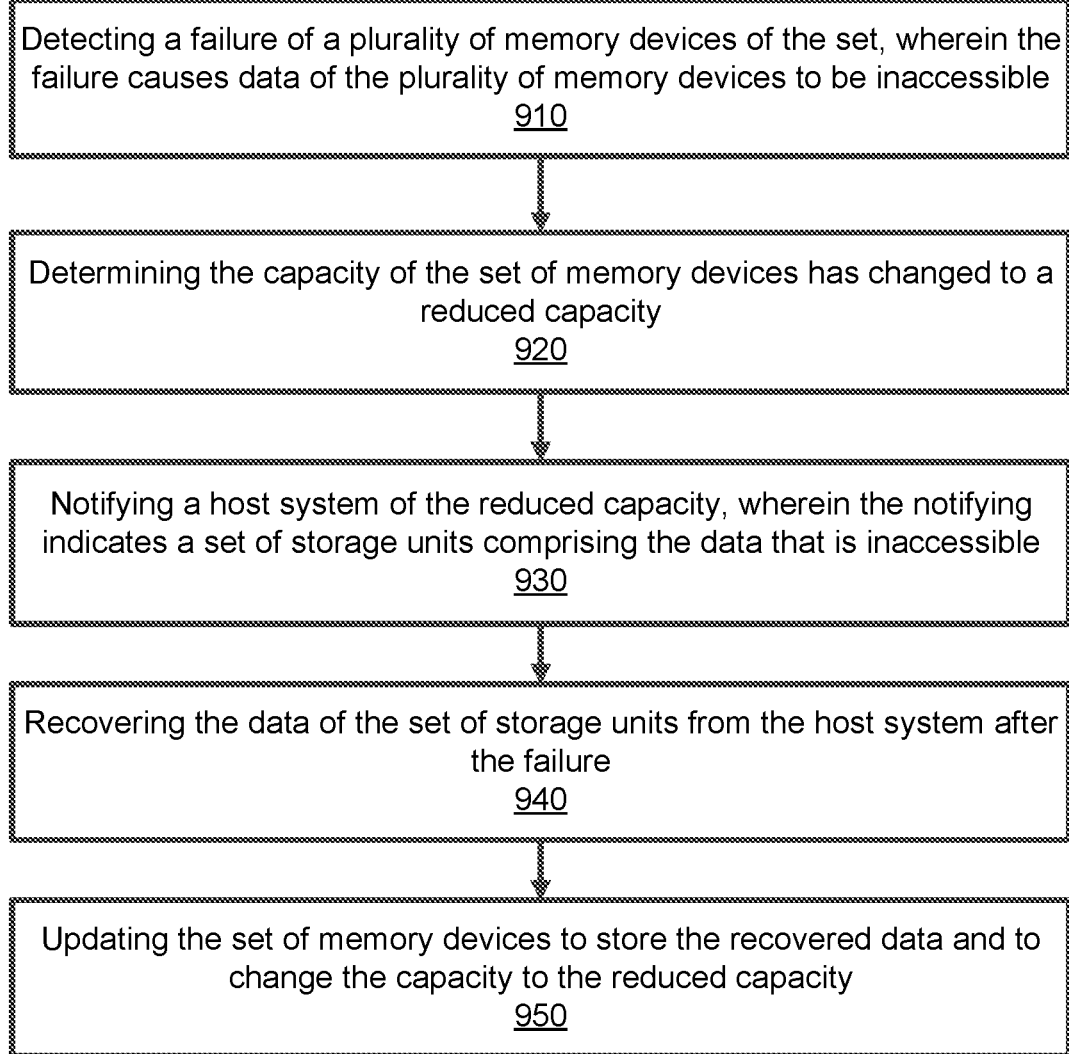
FIG. 9 is a flow chart of another method executed by the memory sub-system to manage a reduction of capacity, in accordance with some embodiments of the present disclosure.

FIG. 9 is a flow chart of a method 900 that is executed by a memory sub-system to manage a reduction to the capacity of the memory sub-system, according to an embodiment. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, the processing logic can detect a failure of multiple memory devices of the set. The failure can cause data of the memory devices to be inaccessible. In one example, the failure of the memory devices is a hardware failure of at least one of a connector, a communication channel, or a die.

At operation 920, the processing logic can determine the capacity of the set of memory devices has changed to a reduced capacity. In one example, memory sub-system is a solid state drive (SSD) and the processing device is a memory controller of the solid state drive.

At operation 930, the processing logic can notify the host system of the reduced capacity. The notification indicates a set of storage units that include the data that is inaccessible due to the failure. In one example, the notifying involves the processing device transmitting a message that indicates to the host system a set of logical blocks that include the data that is inaccessible. In another example, the notifying involves the processing device transmitting a message that indicates to the host system a set of one or more zones that include the data that is inaccessible.

At operation 940, the processing logic can recover the data of the set of storage units from the host system after the failure. The recovering involves the processing device recovering a portion of the data that is inaccessible using parity data stored on the set of memory devices.

At operation 950, the processing logic can update the set of memory devices to store the recovered data and to change the capacity to the reduced capacity. Updating can involve locking the failed portion of the at least one memory device. The locking can include a write lock that enables reads by the host system and disables writes by the host system. The processing device can provide the host system with the recovered data in response to a read request for the failed portion. The processing device can delete data of the at least one memory device and generate or update the parity data for the set of memory devices based on the reduced capacity.

FIG. 10 is a flow chart of a method 1000 that is executed by a host system to manage a reduction to the capacity of a memory sub-system, according to an embodiment. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the processing logic can determine that a failure affects the storage capacity of the memory sub-system. The failure can include a failure of at least one of a die, a connector, or a communication channel of the memory sub-system. The memory sub-system can store data of one or more storage structures of a storage system. In one example, the memory sub-system can be a solid state drive (SSD) and the host system can execute a device driver that communicates with a memory controller of the solid state drive. Determining the failure can involve the host system receiving a message from the memory sub-system that indicates the failure exists and the message can be or include one or more Asynchronous Event Notification (AEN) messages.

At operation 1020, the processing logic can instruct the memory sub-system to operate at a reduced capacity and to retain the stored data of the storage structure. In one example, the storage structure can be a file system and the processing device can configure the storage structure based on the reduced capacity of the memory sub-system.

At operation 1030, the processing logic can receive a set of storage units of the memory sub-system that are affected by the failure. In one example, the set of storage units includes a set of one or more logical blocks (e.g., logical block addresses) that include data that is inaccessible. In another example, the set of storage units includes a set of one or more zones that include data that is inaccessible.

At operation 1040, the processing logic can recover data that was in the set of storage units affected by the failure. In one example, recovering the data involves receiving data recovered by the memory sub-system using parity data. In another example, recovering the data involves receiving data from a copy of the data on another host system. In either example, the processing device can store the received data at a storage location that is in the memory sub-system or in another memory sub-system.

Figure 11:
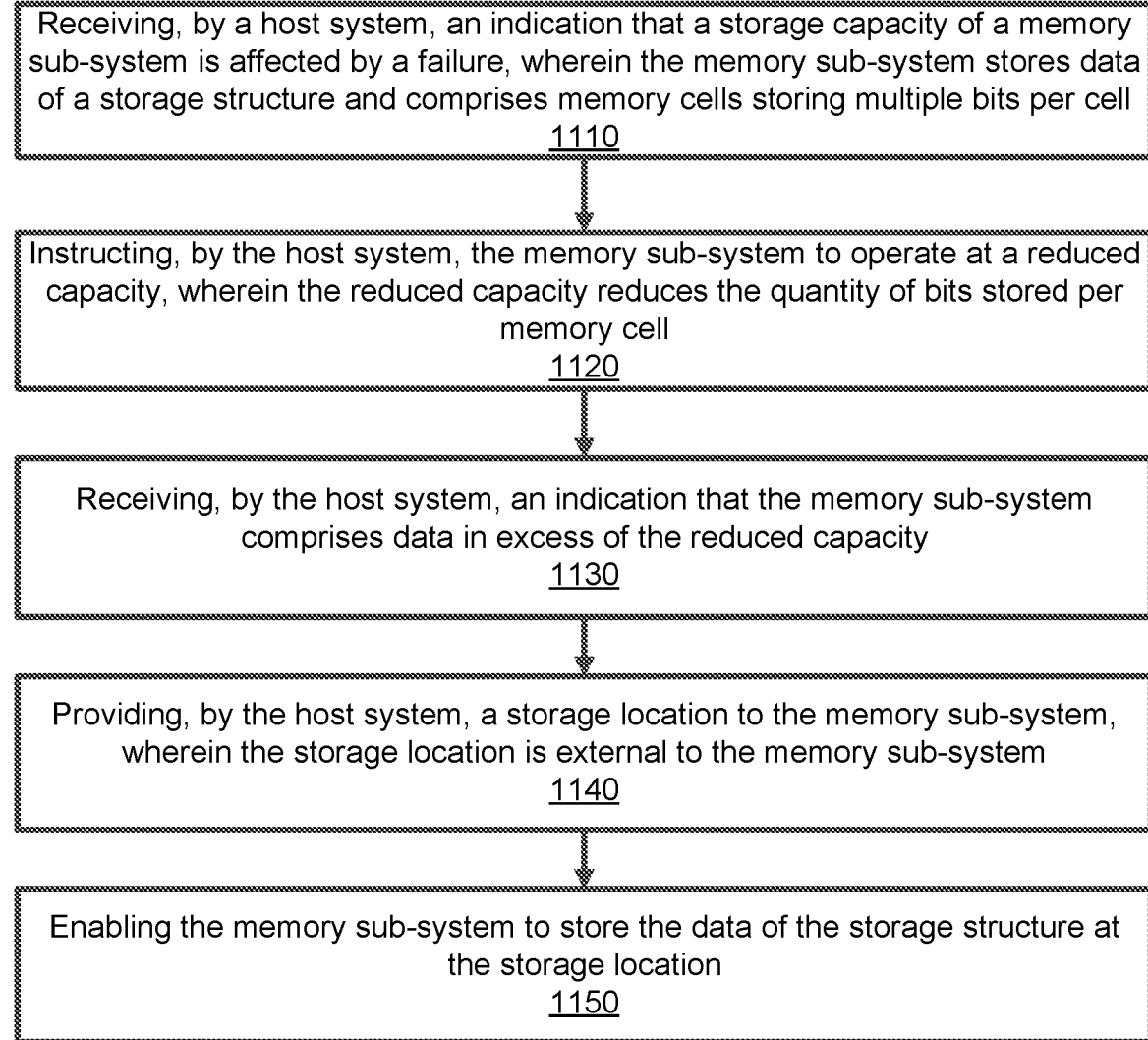
FIG. 11 is a flow chart of another method executed by the host system to manage the reduction of capacity of the memory sub-system, in accordance with some embodiments of the present disclosure.

FIG. 11 is a flow chart of a method 1100 that is executed by a host system to manage a reduction to the capacity of a memory sub-system, according to an embodiment. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1110, the processing logic can receive an indication that a storage capacity of a memory sub-system is affected by a failure. The receiving can involve receiving a first message that indicates the failure exists and receiving a second message that indicates a set of storage units affected by the failure. The first and second message can be Asynchronous Event Notification (AEN) messages. The memory sub-system includes memory cells that store multiple bits per cell and can store data of a storage structure. In one example, the memory sub-system can be a solid state drive (SSD) and the host system executes a device driver that communicates with a memory controller of the solid state drive. In one example, the processing device can configure the storage structure (e.g., file system) based on the reduced capacity of the memory sub-system.

At operation 1120, the processing logic can instruct the memory sub-system to operate at a reduced capacity. The reduced capacity can be the result of reducing the quantity of bits stored per memory cell of the memory sub-system. In one example, the memory cells storing multiple bits per cell can be quad-level cells and instructing the memory sub-system to operate at the reduced capacity causes the quad-level cells to downshift to triple-level cells.

At operation 1130, the processing logic can receive an indication that the memory sub-system includes data in excess of the reduced capacity. This can occur when the memory sub-system is at or is close to filling up the capacity when the failure is detected. The memory sub-system can be able to recover data that is inaccessible (e.g., lost) but does not have a location to store the recovered data.

At operation 1140, the processing logic can provide a storage location to the memory sub-system. The storage location can be external to the memory sub-system and large enough to store the recovered data.

At operation 1150, the processing logic can enable the memory sub-system to store the data of the storage structure at the storage location. Enabling the memory sub-system to store the data can involve the host system enabling the memory sub-system to transmit the data using direct memory access (DMA). In one example, the host system can receive an indication that the storage capacity of the memory sub-system is affected by an additional failure and can instruct the memory sub-system to operate at a further reduced capacity. The further reduced capacity can reduce the quantity of bits stored per memory cell to a single bit per memory cell.

Figure 12:
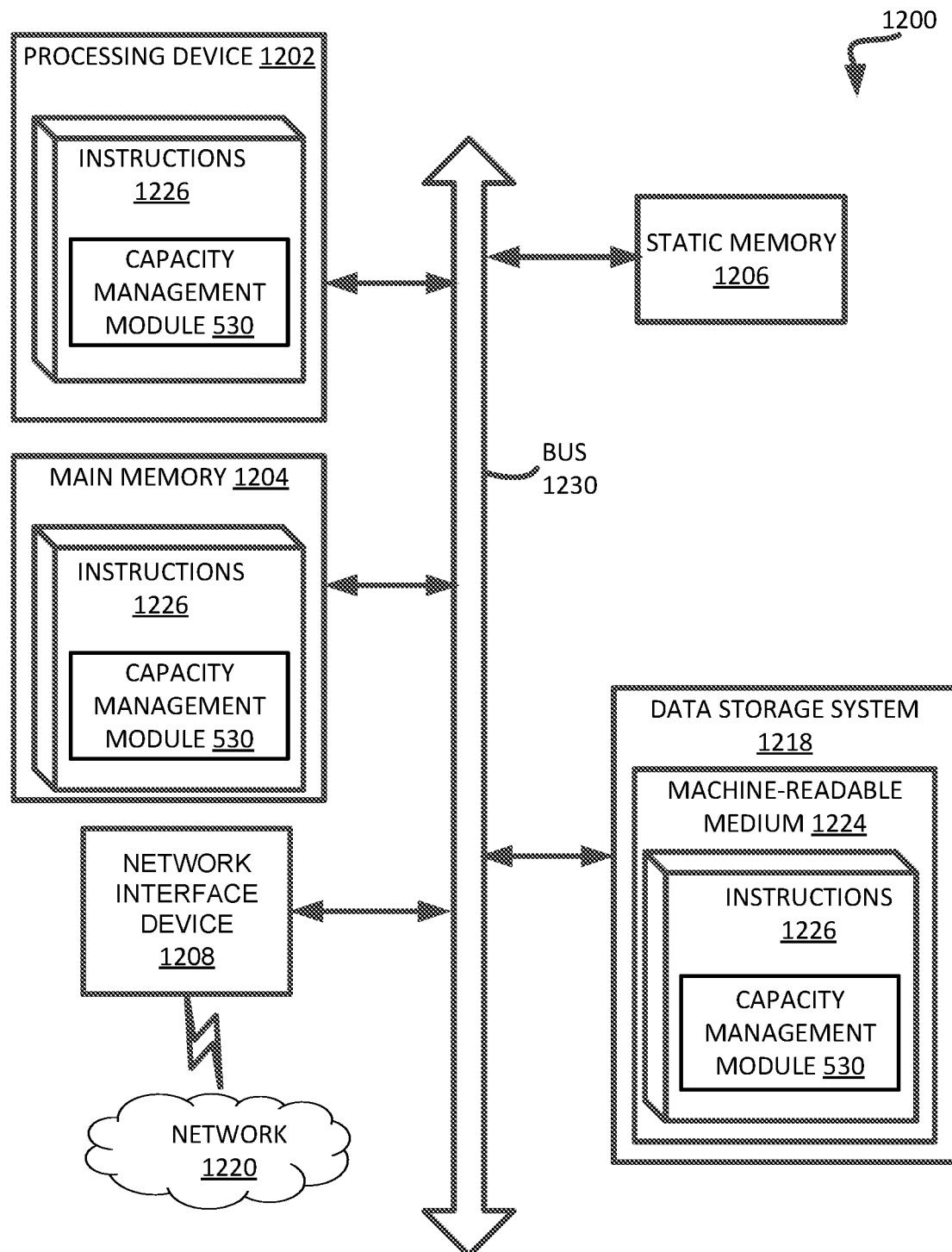
FIG. 12 is a block diagram of an example computer system in which embodiments of the present disclosure can operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIGS. 1-2) that includes, is coupled to, or utilizes a memory sub-system (e.g., memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a non-transitory computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory sub-system 110 of FIG. 1.

In one embodiment, the instructions 1226 include instructions to implement functionality corresponding to the modules and components of FIG. 5 (e.g., capacity management module 530). While the machine-readable storage medium 1224 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a set of memory devices comprising a capacity; and
a processing device, operatively coupled with the set of memory devices, to perform operations comprising:
detecting a failure of a plurality of memory devices of the set, wherein the failure causes data of the plurality of memory devices to be inaccessible;
determining the capacity of the set of memory devices has changed to a reduced capacity;
notifying a host system of the reduced capacity, wherein the notifying indicates a set of storage units comprising the data that is inaccessible;
recovering the data of the set of storage units from the host system after the failure; and
updating the set of memory devices to store the recovered data and to change the capacity to the reduced capacity.

2. The system of claim 1, wherein the failure of the plurality of memory devices of the set comprises a hardware failure of at least one of a connector, a communication channel, or a die.

3. The system of claim 1, wherein the notifying comprises the processing device transmitting a message that indicates to the host system a set of logical blocks that comprises the data that is inaccessible.

4. The system of claim 1, wherein the notifying comprises the processing device transmitting a message that indicates to the host system a set of one or more zones that comprise the data that is inaccessible.

5. The system of claim 1, wherein the system comprises a solid state drive (SSD) and wherein the processing device is a memory controller of the solid state drive.

6. The system of claim 1, wherein the recovering further comprises the processing device recovering a portion of the data that is inaccessible using parity data stored on the set of memory devices.

7. The system of claim 1, further comprising:
locking a failed portion of the at least one memory device, wherein the locking comprises a write lock that enables reads by the host system and disables writes by the host system;
providing the host system with recovered data in response to a read request for the failed portion;
deleting data of the at least one memory device; and
generating parity data for the set of memory devices based on the reduced capacity.

8. A method comprising:
detecting a failure of a plurality of memory devices of a set of memory devices, wherein the failure causes data of the plurality of memory devices to be inaccessible;
determining a capacity of the set of memory devices has changed to a reduced capacity;
notifying, by a processing device, a host system of the reduced capacity, wherein the notifying indicates a set of storage units comprising the data that is inaccessible;
recovering the data of the set of storage units from the host system after the failure; and
updating, by the processing device, the set of memory devices to store the recovered data and to change the capacity to the reduced capacity.

9. The method of claim 8, wherein the failure of the plurality of memory devices of the set comprises a hardware failure of at least one of a connector, a communication channel, or a die.

10. The method of claim 8, wherein the notifying comprises the processing device transmitting a message that indicates to the host system a set of logical blocks that comprises the data that is inaccessible.

11. The method of claim 8, wherein the notifying comprises the processing device transmitting a message that indicates to the host system a set of one or more zones that comprise the data that is inaccessible.

12. The method of claim 8, wherein the processing device is a memory controller of the solid state drive.

13. The method of claim 8, wherein the recovering further comprises the processing device recovering a portion of the data that is inaccessible using parity data stored on the set of memory devices.

14. The method of claim 8, further comprising:
   locking a failed portion of at least one memory device of the set, wherein the locking comprises a write lock that enables reads by the host system and disables writes by the host system;
   providing the host system with recovered data in response to a read request for the failed portion;
   deleting data of the at least one memory device; and
   generating parity data for the set of memory devices based on the reduced capacity.

15. A non-transitory computer-readable medium storing instructions, which when executed by a processing device, cause the processing device to perform operations comprising:
   detecting a plurality of failures of a set of memory devices, wherein a first failure causes data of a first memory device to be inaccessible and a second failure causes data of a second memory device to be inaccessible;
   determining a capacity of the set of memory devices has changed to a reduced capacity after each of the plurality of failures;
   notifying, by a processing device, a host system of the reduced capacity after each of the plurality of failures, wherein the notifying indicates a set of storage units affected by the respective failure;
   recovering data of the set of storage units from the host system after each of the plurality of failures; and
   updating, after each of the plurality of failures, the set of memory devices to store the recovered data and to reduce the capacity.

16. The non-transitory computer-readable medium of claim 15, wherein the first failure comprises a hardware failure of at least one of a connector, a communication channel, or a die.

17. The non-transitory computer-readable medium of claim 15, wherein the notifying comprises the processing device transmitting a message that indicates to the host system a set of logical blocks that comprises the data of the first memory device that is inaccessible.

18. The non-transitory computer-readable medium of claim 15, wherein the notifying comprises the processing device transmitting a message that indicates to the host system a set of one or more zones that comprise the data of the first memory device that is inaccessible.

19. The non-transitory computer-readable medium of claim 15, wherein the processing device is a memory controller of a solid state drive.

20. The non-transitory computer-readable medium of claim 15, further comprising:
   locking a failed portion of at least one memory device of the set, wherein the locking comprises a write lock that enables reads by the host system and disables writes by the host system;
   providing the host system with recovered data in response to a read request for the failed portion;
   deleting data of the at least one memory device; and
   generating parity data for the set of memory devices based on the reduced capacity.

\* \* \* \* \*